US011057780B2

(12) United States Patent
Tsai et al.

(10) Patent No.: US 11,057,780 B2
(45) Date of Patent: Jul. 6, 2021

(54) CHANNEL UTILIZATION IN UNLICENSED SPECTRUM

(71) Applicant: Mediatek Inc., Hsin-Chu (TW)

(72) Inventors: Chiou-Wei Tsai, Hsin-Chu (TW); Jiann-Ching Guey, Hsin-Chu (TW); Chun-Hsuan Kuo, San Jose, CA (US); Cheng-Rung Tsai, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 39 days.

(21) Appl. No.: 16/536,576

(22) Filed: Aug. 9, 2019

(65) Prior Publication Data
US 2020/0053571 A1 Feb. 13, 2020

Related U.S. Application Data

(60) Provisional application No. 62/717,136, filed on Aug. 10, 2018, provisional application No. 62/717,131, filed on Aug. 10, 2018.

(51) Int. Cl.
*H04W 16/14* (2009.01)
*H04W 74/08* (2009.01)

(52) U.S. Cl.
CPC ....... *H04W 16/14* (2013.01); *H04W 74/0808* (2013.01)

(58) Field of Classification Search
CPC .......................... H04L 1/0072; H04L 1/0045
See application file for complete search history.

(56) References Cited

U.S. PATENT DOCUMENTS

| 2014/0036881 | A1* | 2/2014 | Kim | ........................ | H04L 5/003 |
| | | | | | 370/336 |
| 2016/0301556 | A1* | 10/2016 | Nory | ..................... | H04W 16/14 |
| 2019/0132882 | A1 | 5/2019 | Li et al. | | |
| 2019/0306850 | A1* | 10/2019 | Zhang | .................. | H04B 7/0639 |

(Continued)

FOREIGN PATENT DOCUMENTS

| CN | 102918897 A | 2/2013 |
| CN | 105323859 A | 2/2016 |
| CN | 106304386 A | 1/2017 |

(Continued)

OTHER PUBLICATIONS

International Serach Report of PCT/CN2019/100201, dated Oct. 31, 2019.

(Continued)

*Primary Examiner* — Hoon J Chung
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a UE. The UE receives, from a base station, one or more downlink reference signals on an unlicensed carrier. The UE determines that the base station occupies the unlicensed carrier for a predetermined first channel occupancy time based on the one or more downlink reference signals. The UE receives, on the unlicensed carrier and in the predetermined first channel occupancy time, a control burst including a plurality of down link control channels. The UE attempts to decode a first down link control channel directed to the UE from the control burst.

20 Claims, 21 Drawing Sheets

(56) References Cited

U.S. PATENT DOCUMENTS

2020/0275420 A1* 8/2020 Chen ................. H04W 68/00

FOREIGN PATENT DOCUMENTS

| EP | 3018858 A1 | 5/2016 | | |
|---|---|---|---|---|
| WO | 2016071741 A1 | 5/2016 | | |
| WO | 2016179831 A1 | 11/2016 | | |
| WO | 2017045205 A1 | 3/2017 | | |
| WO | 2017142589 A1 | 8/2017 | | |
| WO | WO-2018085701 A1 * | 5/2018 | ......... | H04L 27/2613 |
| WO | 2018106841 A1 | 6/2018 | | |

OTHER PUBLICATIONS

Taiwan Patent Office, "Office Action", dated Jan. 19, 2021, Taiwan.
Taiwan Patent Office, "Office Action", dated Feb. 17, 2021, Taiwan.

\* cited by examiner

CHANNEL UTILIZATION IN UNLICENSED SPECTRUM

CROSS-REFERENCE TO RELATED APPLICATION(S)

This application claims the benefits of U.S. Provisional Application Ser. No. 62/717,131, entitled "RACH DESIGN FOR UNLICENSED SPECTRUM" and filed on Aug. 10, 2018; and U.S. Provisional Application Ser. No. 62/717,136, entitled "METHODS FOR RETAINING CHANNEL ACCESS IN UNLICENSED SPECTRUM" and filed on Aug. 10, 2018; all of which are expressly incorporated by reference herein in their entirety.

BACKGROUND

Field

The present disclosure relates generally to communication systems, and more particularly, to techniques of utilizing channels in an unlicensed spectrum.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE receives, from a base station, one or more downlink reference signals on an unlicensed carrier. The UE determines that the base station occupies the unlicensed carrier for a predetermined first channel occupancy time based on the one or more downlink reference signals. The UE receives, on the unlicensed carrier and in the predetermined first channel occupancy time, a control burst including a plurality of down link control channels. The UE attempts to decode a first down link control channel directed to the UE from the control burst.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
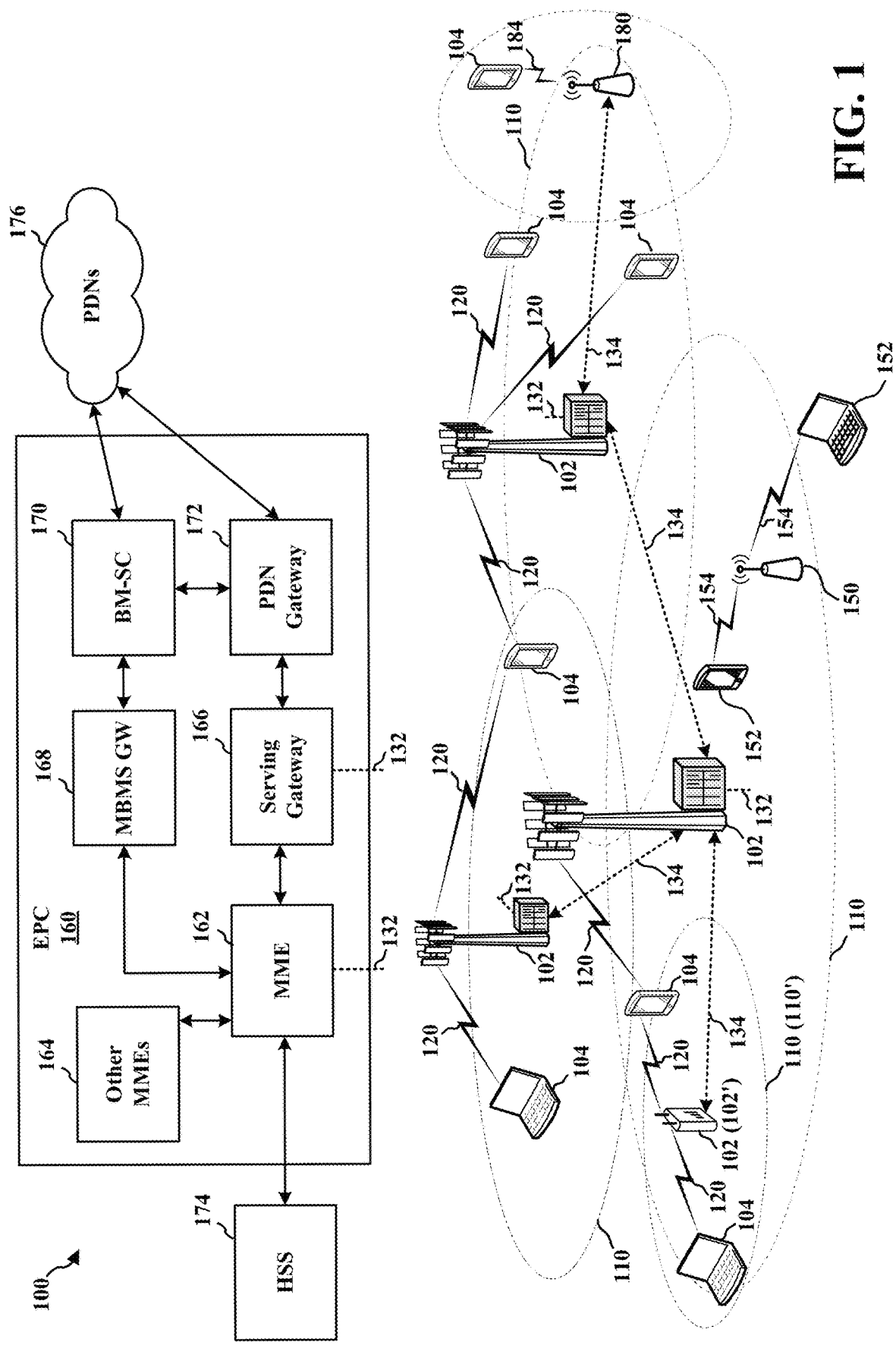
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and a core network 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the core network 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the core network 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include up-link (UL) (also referred to as reverse link) transmissions from a UE 104 to a base station 102 and/or down-link (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The core network 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the core network 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the core network 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figures 2A, 2B:
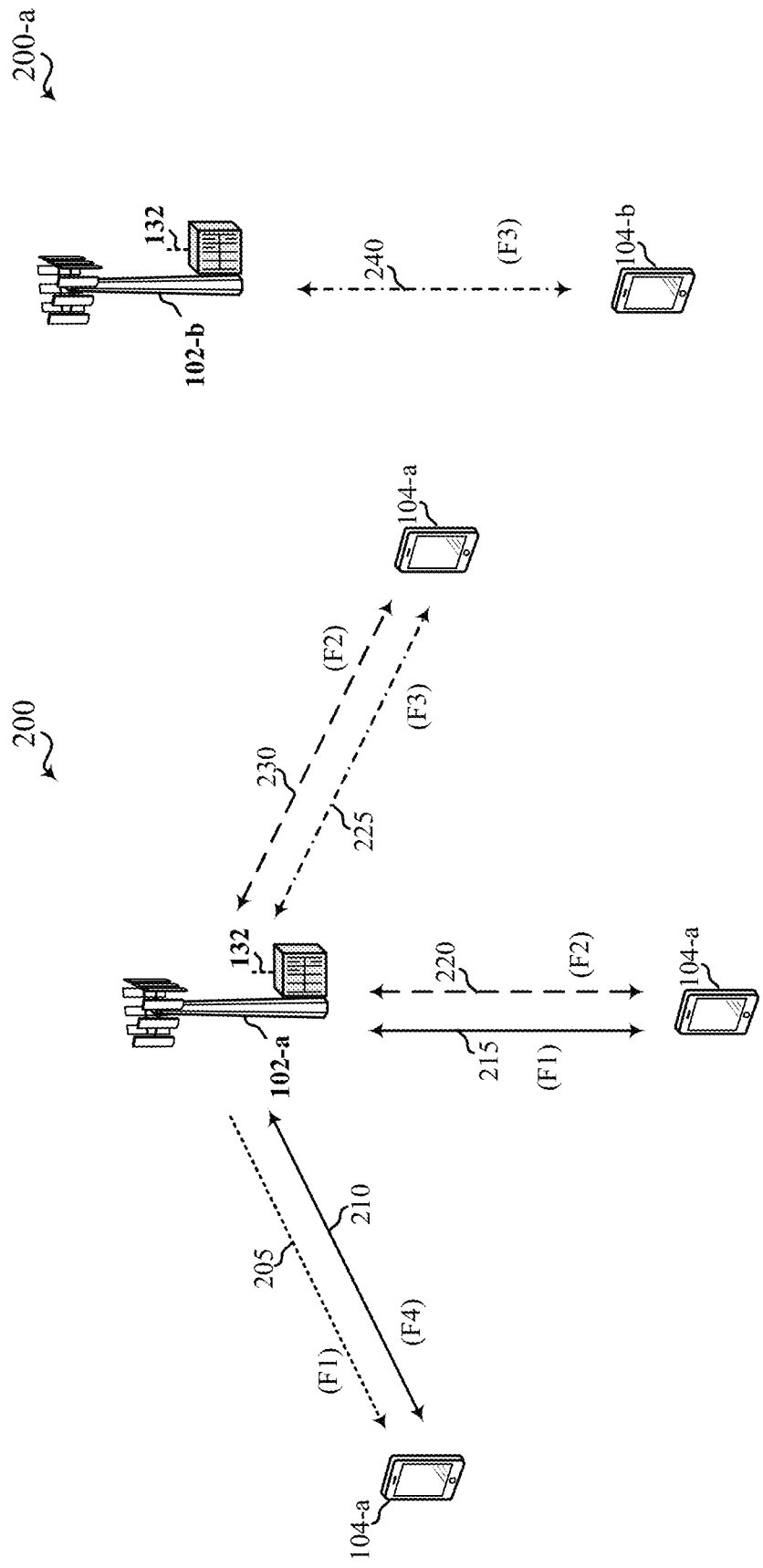
FIG. 2A is a diagram illustrating examples of a supplemental downlink mode and of a carrier aggregation mode for a core network that supports unlicensed contention-based shared spectrum.
FIG. 2B is a diagram that illustrates an example of a standalone mode for licensed spectrum extended to unlicensed contention-based shared spectrum.

FIG. 2A is a diagram 200 illustrating examples of a supplemental downlink mode (e.g., licensed assisted access (LAA) mode) and of a carrier aggregation mode for a core network that supports unlicensed contention-based shared spectrum. The diagram 200 may be an example of portions of the system 100 of FIG. 1. Moreover, the base station 102-a may be an example of the base stations 102 of FIG. 1, while the UEs 104-a may be examples of the UEs 104 of FIG. 1.

In the example of a supplemental downlink mode (e.g., LAA mode) in diagram 200, the base station 102-a may transmit OFDMA communications signals to a UE 104-a using a downlink 205. The downlink 205 is associated with a frequency F1 in an unlicensed spectrum. The base station 102-a may transmit OFDMA communications signals to the same UE 104-a using a bidirectional link 210 and may receive SC-FDMA communications signals from that UE 104-a using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 102-a. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 102-a may transmit OFDMA communications signals to a UE 104-a using a bidirectional link 215 and may receive SC-FDMA communications signals from the same UE 104-a using the bidirectional link 215. The bidirectional link 215 is associated with the frequency F1 in the unlicensed spectrum. The base station 102-a may also transmit OFDMA communications signals to the same UE 104-a using a bidirectional link 220 and may receive SC-FDMA communications signals from the same UE 104-a using the bidirectional link 220. The bidirectional link 220 is associated with a frequency F2 in a licensed spectrum. The bidirectional link 215 may provide a downlink and uplink capacity offload for the base station 102-a. Like the supplemental downlink (e.g., LAA mode) described above, this scenario may occur with any service provider (e.g., MNO) that uses a licensed spectrum and needs to relieve some of the traffic and/or signaling congestion.

In another example of a carrier aggregation mode in diagram 200, the base station 102-a may transmit OFDMA communications signals to a UE 104-a using a bidirectional link 225 and may receive SC-FDMA communications signals from the same UE 104-a using the bidirectional link 225. The bidirectional link 225 is associated with the frequency F3 in an unlicensed spectrum. The base station 102-a may also transmit OFDMA communications signals to the same UE 104-a using a bidirectional link 230 and may receive SC-FDMA communications signals from the same UE 104-a using the bidirectional link 230. The bidirectional link 230 is associated with the frequency F2 in the licensed spectrum. The bidirectional link 225 may provide a downlink and uplink capacity offload for the base station 102-a. This example and those provided above are presented for illustrative purposes and there may be other similar modes of operation or deployment scenarios that combine licensed spectrum with or without unlicensed contention-based shared spectrum for capacity offload.

As described supra, the typical service provider that may benefit from the capacity offload offered by using licensed spectrum extended to unlicensed contention-based spectrum is a traditional MNO with licensed spectrum. For these service providers, an operational configuration may include a bootstrapped mode (e.g., supplemental downlink (e.g., LAA mode), carrier aggregation) that uses primary component carrier (PCC) on the non-contention spectrum and the secondary component carrier (SCC) on the contention-based spectrum.

In the supplemental downlink mode, control for contention-based spectrum may be transported over an uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in an unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in licensed spectrum (e.g., bidirectional links 210, 220, and 230) while data may be communicated in licensed spectrum extended to unlicensed contention-based shared spectrum (e.g., bidirectional links 215 and 225). The carrier aggregation mechanisms supported when using licensed spectrum extended to unlicensed contention-based shared spectrum may fall under a hybrid frequency division duplexing-time division duplexing (FDD-TDD) carrier aggregation or a TDD-TDD carrier aggregation with different symmetry across component carriers.

FIG. 2B shows a diagram 200-a that illustrates an example of a standalone mode for licensed spectrum extended to unlicensed contention-based shared spectrum. The diagram 200-a may be an example of portions of the access network 100 of FIG. 1. Moreover, the base station 102-b may be an example of the base stations 102 of FIG. 1 and the base station 102-a of FIG. 2A, while the UE 104-b may be an example of the UEs 104 of FIG. 1 and the UEs 104-a of FIG. 2A. In the example of a standalone mode in diagram 200-a, the base station 102-b may transmit OFDMA communications signals to the UE 104-b using a bidirectional link 240 and may receive SC-FDMA communications signals from the UE 104-b using the bidirectional link 240. The bidirectional link 240 is associated with the frequency F3 in a contention-based shared spectrum described above with reference to FIG. 2A. The standalone mode may be used in non-traditional wireless access scenarios, such as in-stadium access (e.g., unicast, multicast). An example of the typical service provider for this mode of operation may be a stadium owner, cable company, event hosts, hotels, enterprises, and large corporations that do not have licensed spectrum. For these service providers, an operational configuration for the standalone mode may use the PCC on the contention-based spectrum. Moreover, LBT may be implemented on both the base station and the UE.

In some examples, a transmitting apparatus such as one of the base stations 102, 205, or 205-a described with reference to FIG. 1, 2A, or 2B, or one of the UEs 104, 215, 215-a, 215-b, or 215-c described with reference to FIG. 1, 2A, or 2B, may use a gating interval to gain access to a channel of a contention-based shared radio frequency spectrum band (e.g., to a physical channel of an unlicensed radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based at least in part on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of a contention-based shared radio frequency spectrum band is available or in use for the gating interval (also referred to as an LBT radio frame). When a CCA procedure indicates that the channel is available for a corresponding LBT radio frame (e.g., clear for use), the transmitting apparatus may reserve or use the channel of the contention-based shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
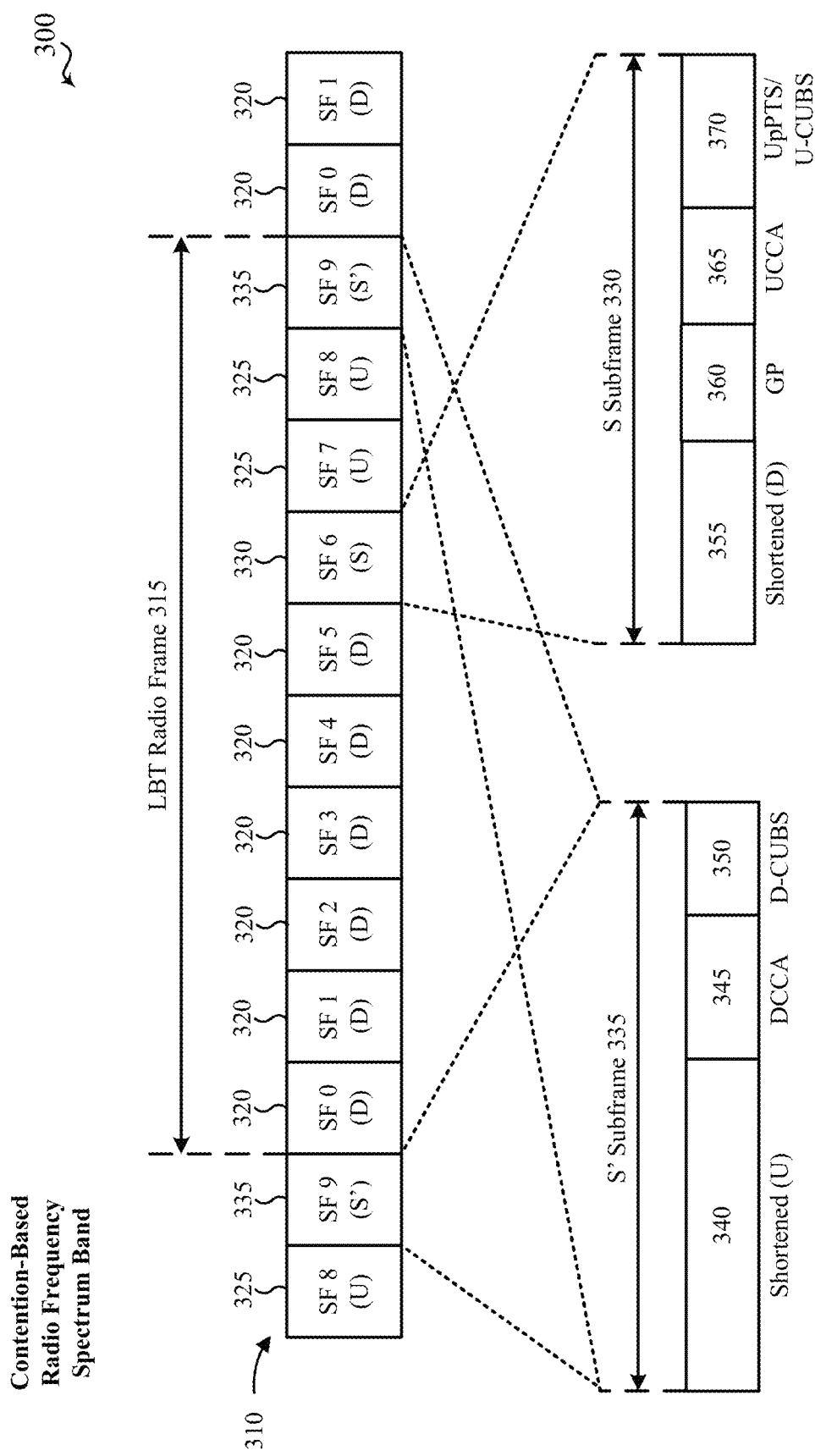
FIG. 3 is an illustration of an example of a wireless communication over an unlicensed radio frequency spectrum band.

The number and arrangement of components shown in FIGS. 2A and 2B are provided as an example. In practice, wireless communication system may include additional devices, fewer devices, different devices, or differently arranged devices than those shown in FIGS. 2A and 2B. FIG. 3 is an illustration of an example 300 of a wireless communication 310 over an unlicensed radio frequency spectrum band, in accordance with various aspects of the present disclosure. In some examples, an LBT radio frame 315 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320 and, in some examples, a transition between LBT radio frames.

During the S' subframe 335, a downlink clear channel assessment (CCA) procedure 345 may be performed by one or more base stations, such as one or more of the base stations 102, 205, or 205-a described with reference to FIG. 1 or 2, to reserve, for a period of time, a channel of the contention-based shared radio frequency spectrum band over which the wireless communication 310 occurs. Following a successful downlink CCA procedure 345 by a base station, the base station may transmit a preamble, such as a channel usage beacon signal (CUBS) (e.g., a downlink CUBS (D-CUBS 350)) to provide an indication to other base stations or apparatuses (e.g., UEs, Wi-Fi access points, etc.) that the base station has reserved the channel. In some examples, a D-CUBS 350 may be transmitted using a plurality of interleaved resource blocks. Transmitting a D-CUBS 350 in this manner may enable the D-CUBS 350 to occupy at least a certain percentage of the available frequency bandwidth of the contention-based shared radio frequency spectrum band and satisfy one or more regulatory requirements (e.g., a requirement that transmissions over an unlicensed radio frequency spectrum band occupy at least 80% of the available frequency bandwidth). The D-CUBS 350 may in some examples take a form similar to that of cell-specific reference signal (CRS), a channel state information reference signal (CSI-RS), a demodulation reference signal (DMRS), a preamble sequence, a synchronization signal, or a physical downlink control channel (PDCCH). When the downlink CCA procedure 345 fails, the D-CUBS 350 may not be transmitted.

The S' subframe 335 may include a plurality of OFDM symbol periods (e.g., 14 OFDM symbol periods). A first portion of the S' subframe 335 may be used by a number of UEs as a shortened uplink (U) period 340. A second portion of the S' subframe 335 may be used for the downlink CCA procedure 345. A third portion of the S' subframe 335 may be used by one or more base stations that successfully contend for access to the channel of the contention-based shared radio frequency spectrum band to transmit the D-CUBS 350.

During the S subframe 330, an uplink CCA procedure 365 may be performed by one or more UEs, such as one or more of the UEs 104, 215, 215-a, 215-b, or 215-c described above with reference to FIG. 1, 2A, or 2B, to reserve, for a period of time, the channel over which the wireless communication 310 occurs. Following a successful uplink CCA procedure 365 by a UE, the UE may transmit a preamble, such as an uplink CUBS (U-CUBS 370) to provide an indication to other UEs or apparatuses (e.g., base stations, Wi-Fi access points, etc.) that the UE has reserved the channel. In some examples, a U-CUBS 370 may be transmitted using a plurality of interleaved resource blocks. Transmitting a U-CUBS 370 in this manner may enable the U-CUBS 370 to occupy at least a certain percentage of the available frequency bandwidth of the contention-based radio frequency spectrum band and satisfy one or more regulatory requirements (e.g., the requirement that transmissions over the contention-based radio frequency spectrum band occupy at least 80% of the available frequency bandwidth). The U-CUBS 370 may in some examples take a form similar to that of an LTE/LTE-A CRS or CSI-RS. When the uplink CCA procedure 365 fails, the U-CUBS 370 may not be transmitted.

The S subframe 330 may include a plurality of OFDM symbol periods (e.g., 14 OFDM symbol periods). A first portion of the S subframe 330 may be used by a number of base stations as a shortened downlink (D) period 355. A second portion of the S subframe 330 may be used as a guard period (GP) 360. A third portion of the S subframe 330 may be used for the uplink CCA procedure 365. A fourth portion of the S subframe 330 may be used by one or more UEs that successfully contend for access to the channel of the contention-based radio frequency spectrum band as an uplink pilot time slot (UpPTS) or to transmit the U-CUBS 370.

In some examples, the downlink CCA procedure 345 or the uplink CCA procedure 365 may include the performance of a single CCA procedure. In other examples, the downlink CCA procedure 345 or the uplink CCA procedure 365 may include the performance of an extended CCA procedure. The extended CCA procedure may include a random number of CCA procedures, and in some examples may include a plurality of CCA procedures.

Figure 4:
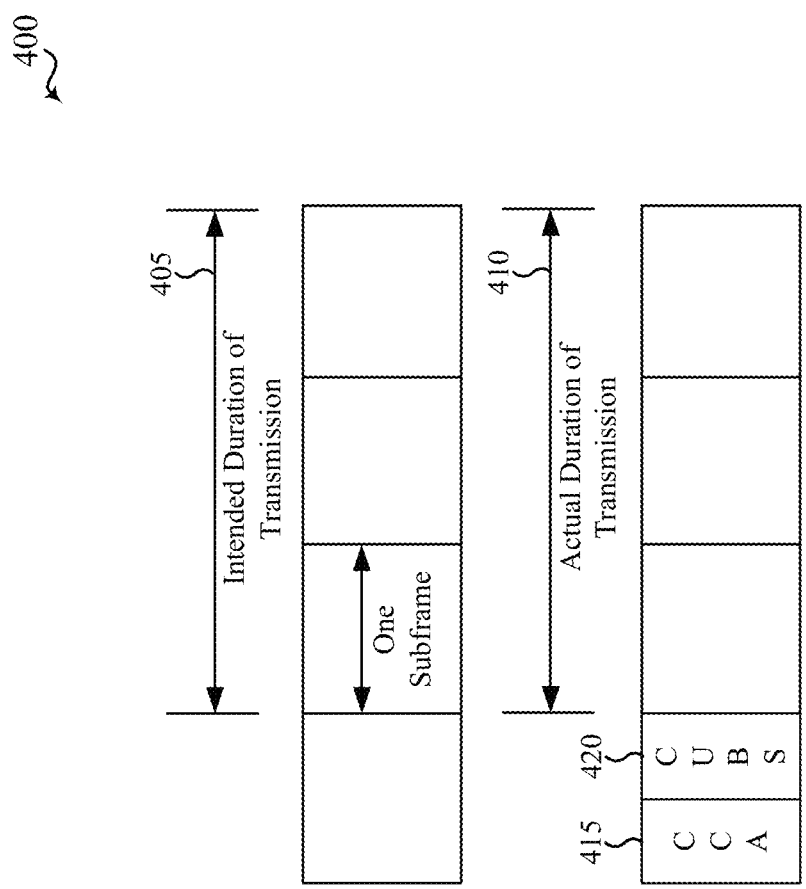
FIG. 4 is an illustration of an example of a CCA procedure performed by a transmitting apparatus when contending for access to a contention-based shared radio frequency spectrum band.

As indicated above, FIG. 3 is provided as an example. Other examples are possible and may differ from what was described in connection with FIG. 3. FIG. 4 is an illustration of an example 400 of a CCA procedure 415 performed by a transmitting apparatus when contending for access to a contention-based shared radio frequency spectrum band, in accordance with various aspects of the present disclosure. In some examples, the CCA procedure 415 may be an example of the downlink CCA procedure 345 or uplink CCA procedure 365 described with reference to FIG. 3. The CCA procedure 415 may have a fixed duration. In some examples, the CCA procedure 415 may be performed in accordance with an LBT-frame based equipment (LBT-FBE) protocol (e.g., the LBT-FBE protocol described by EN 301 893). Following the CCA procedure 415, a channel reserving signal, such as a CUBS 420, may be transmitted, followed by a data transmission (e.g., an uplink transmission or a downlink transmission). By way of example, the data transmission may have an intended duration 405 of three subframes and an actual duration 410 of three subframes.

As indicated above, FIG. 4 is provided as an example. Other examples are possible and may differ from what was described in connection with FIG. 4.

Figure 5:
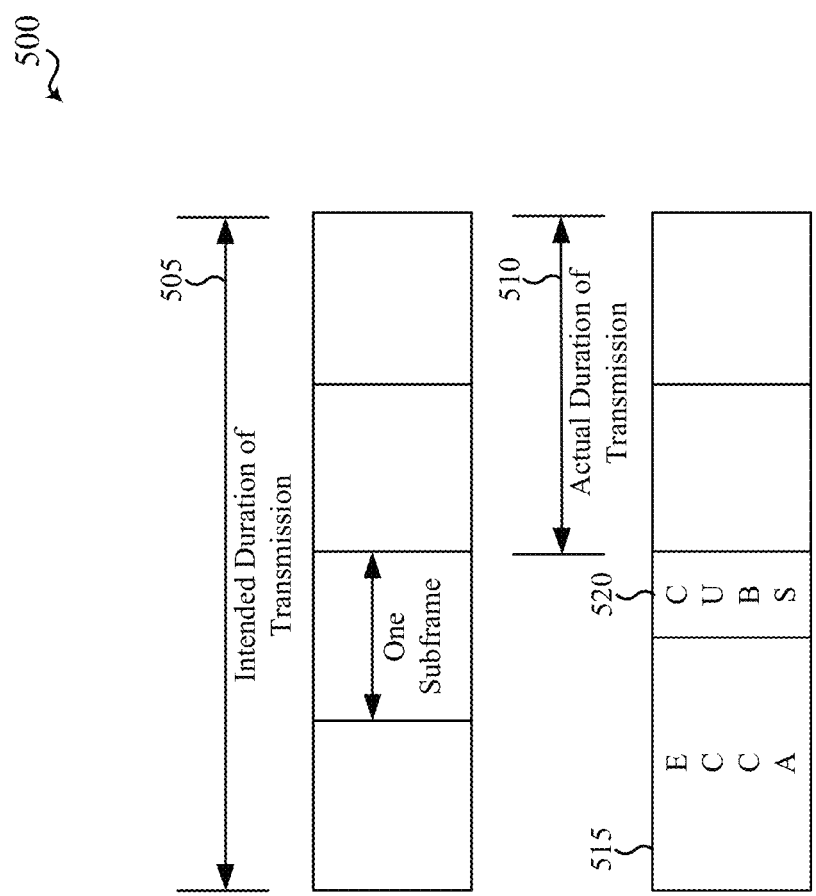
FIG. 5 is an illustration of an example of an extended CCA (ECCA) procedure performed by a transmitting apparatus when contending for access to a contention-based shared radio frequency spectrum band.

FIG. 5 is an illustration of an example 500 of an extended CCA (ECCA) procedure 515 performed by a transmitting apparatus when contending for access to a contention-based shared radio frequency spectrum band, in accordance with various aspects of the present disclosure. In some examples, the ECCA procedure 515 may be an example of the downlink CCA procedure 345 or uplink CCA procedure 365 described with reference to FIG. 3. The ECCA procedure 515 may include a random number of CCA procedures, and in some examples may include a plurality of CCA procedures. The ECCA procedure 515 may, therefore, have a variable duration. In some examples, the ECCA procedure 515 may be performed in accordance with an LBT-load based equipment (LBT-LBE) protocol (e.g., the LBT-LBE protocol described by EN 301 893). The ECCA procedure 515 may provide a greater likelihood of winning contention to access the contention-based shared radio frequency spectrum band, but at a potential cost of a shorter data transmission. Following the ECCA procedure 515, a channel reserving signal, such as a CUBS 520, may be transmitted, followed by a data transmission. By way of example, the data transmission may have an intended duration 505 of three subframes and an actual duration 510 of two subframes.

As indicated above, FIG. 5 is provided as an example. Other examples are possible and may differ from what was described in connection with FIG. 5.

Figure 6:
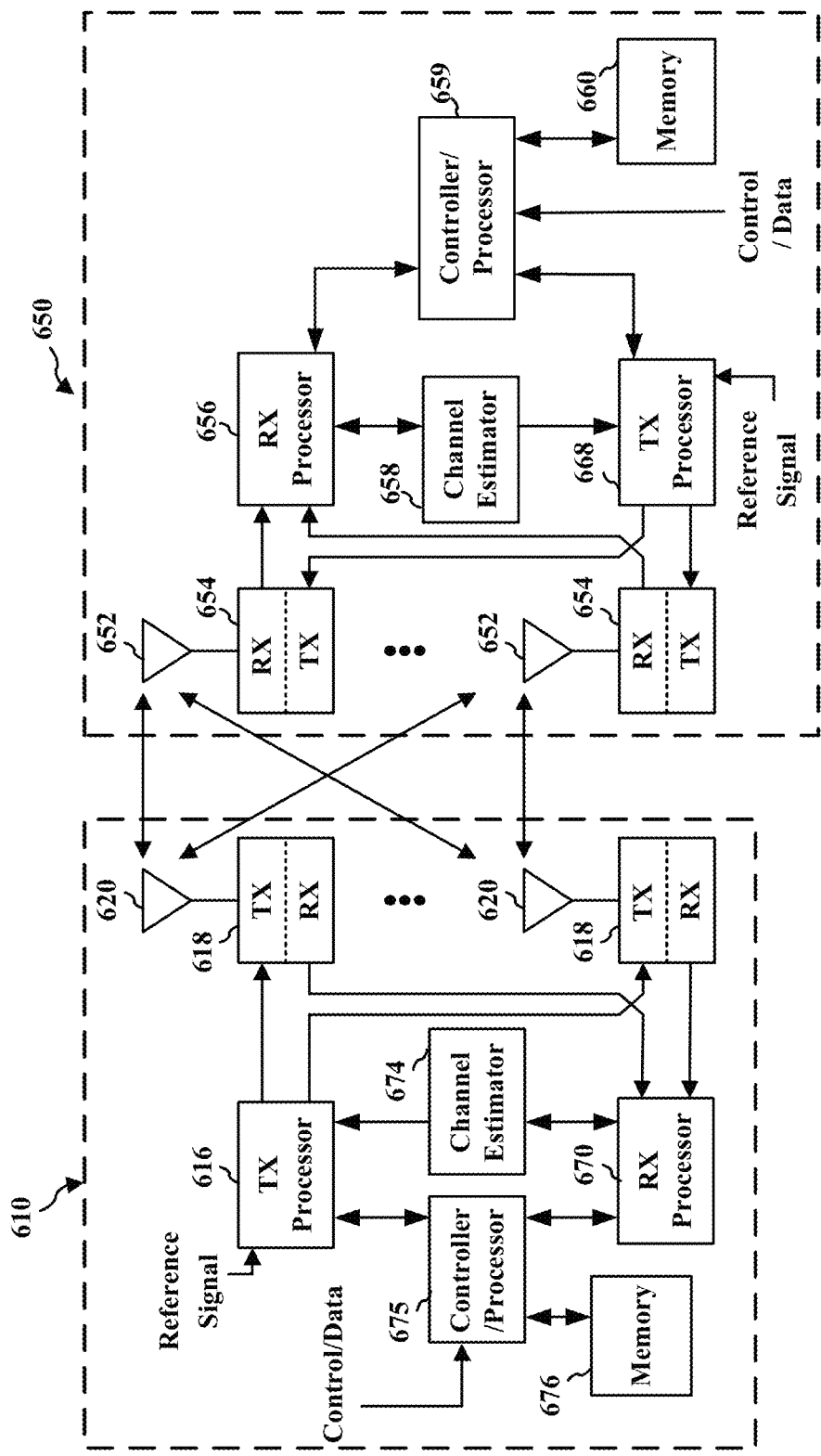
FIG. 6 is a diagram illustrating a base station in communication with a UE in an access network.

FIG. 6 is a block diagram of a base station 610 in communication with a UE 650 in an access network. In the DL, IP packets from the core network 160 may be provided to a controller/processor 675. The controller/processor 675 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 675 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 616 and the receive (RX) processor 670 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 616 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The TX processor 668 and the RX processor 656 implement layer 1 functionality associated with various signal processing functions. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 610. These soft decisions may be based on channel estimates computed by the channel estimator 658. The soft decisions are then decoded and deinterleaved to recover the data and control signals that were originally transmitted by the base station 610 on the physical channel. The data and control signals are then provided to the controller/processor 659, which implements layer 3 and layer 2 functionality.

The controller/processor 659 can be associated with a memory 660 that stores program codes and data. The memory 660 may be referred to as a computer-readable medium. In the UL, the controller/processor 659 provides demultiplexing between transport and logical channels, packet reassembly, deciphering, header decompression, and control signal processing to recover IP packets from the core network 160. The controller/processor 659 is also responsible for error detection using an ACK and/or NACK protocol to support HARQ operations.

Similar to the functionality described in connection with the DL transmission by the base station 610, the controller/processor 659 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 658 from a reference signal or feedback transmitted by the base station 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission. The UL transmission is processed at the base station 610 in a manner similar to that described in connection with the receiver function at the UE 650. Each receiver 618RX receives a signal through its respective antenna 620. Each receiver 618RX recovers information modulated onto an RF carrier and provides the information to a RX processor 670.

The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover IP packets from the UE 650. IP packets from the controller/processor 675 may be provided to the core network 160. The controller/processor 675 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the up-link and down-link and may include support for half-duplex operation using time division duplexing (TDD). NR may include Enhanced Mobile Broadband (eMBB) service targeting wide bandwidth (e.g., 80 MHz beyond), millimeter wave (mmW) targeting high carrier frequency (e.g., 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 60 kHz over a 0.125 ms duration or a bandwidth of 15 kHz over a 0.5 ms duration. Each radio frame may consist of 20 or 80 subframes (or NR slots) with a length of 10 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 9 and 10.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit down-link signals to UEs indicating the cell type. Based on the cell type indication, the UE may communicate with the NR BS. For example, the UE may determine NR BSs to consider for cell selection, access, handover, and/or measurement based on the indicated cell type.

Figure 7:
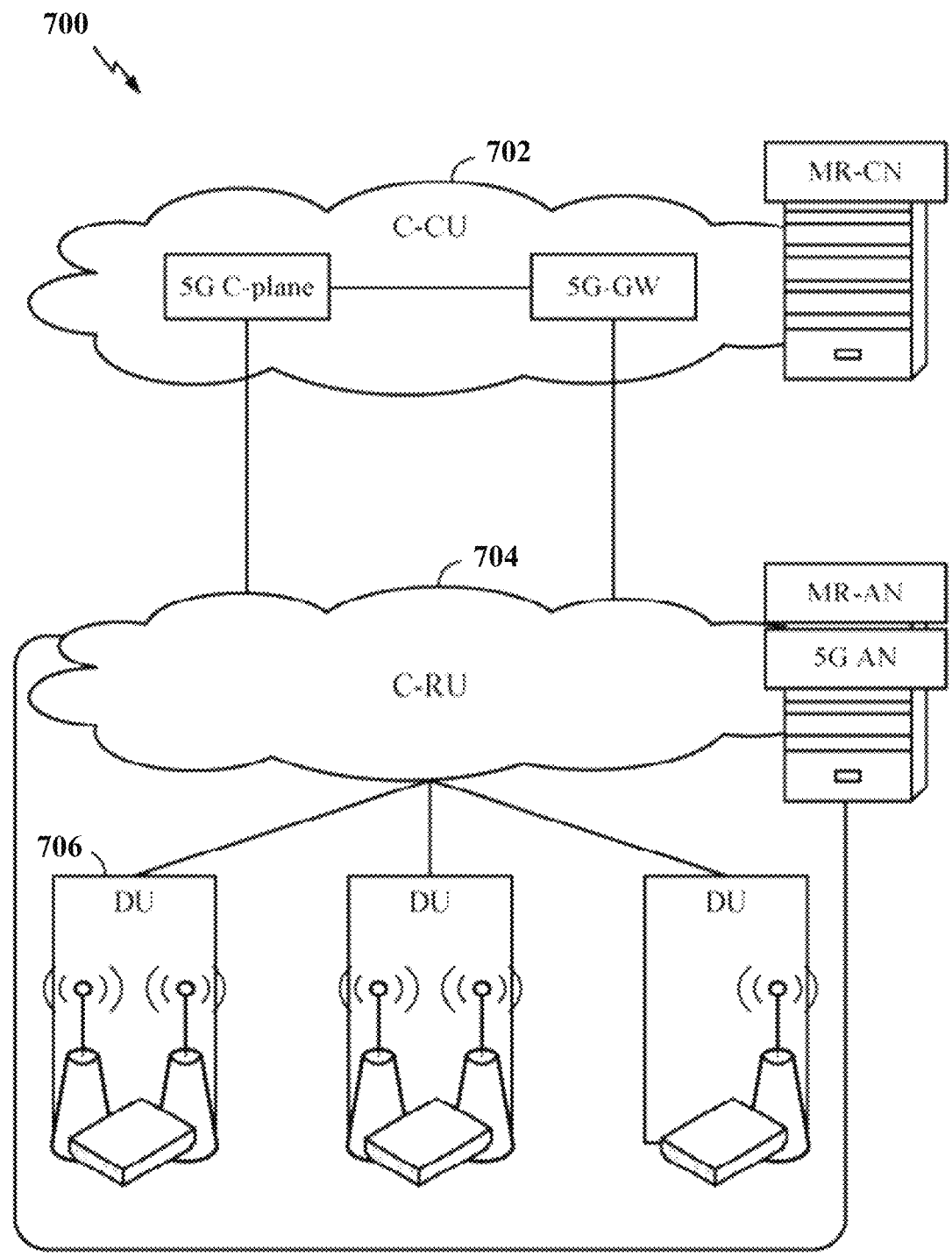
FIG. 7 illustrates an example logical architecture of a distributed access network.

FIG. 7 illustrates an example logical architecture of a distributed RAN, according to aspects of the present disclosure. A 5G access node 706 may include an access node controller (ANC) 702. The ANC may be a central unit (CU) of the distributed RAN 700. The backhaul interface to the next generation core network (NG-CN) 704 may terminate at the ANC. The backhaul interface to neighboring next generation access nodes (NG-ANs) may terminate at the ANC. The ANC may include one or more TRPs 708 (which may also be referred to as BSs, NR BSs, Node Bs, 5GNBs, APs, or some other term). As described above, a TRP may be used interchangeably with "cell."

The TRPs 708 may be a distributed unit (DU). The TRPs may be connected to one ANC (ANC 702) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 700 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 710 may support dual connectivity with NR. The NG-AN may share a common fronthaul for LTE and NR.

The architecture may enable cooperation between and among TRPs 708. For example, cooperation may be preset within a TRP and/or across TRPs via the ANC 702. According to aspects, no inter-TRP interface may be needed/present.

According to aspects, a dynamic configuration of split logical functions may be present within the architecture of the distributed RAN 700. The PDCP, RLC, MAC protocol may be adaptably placed at the ANC or TRP.

Figure 8:
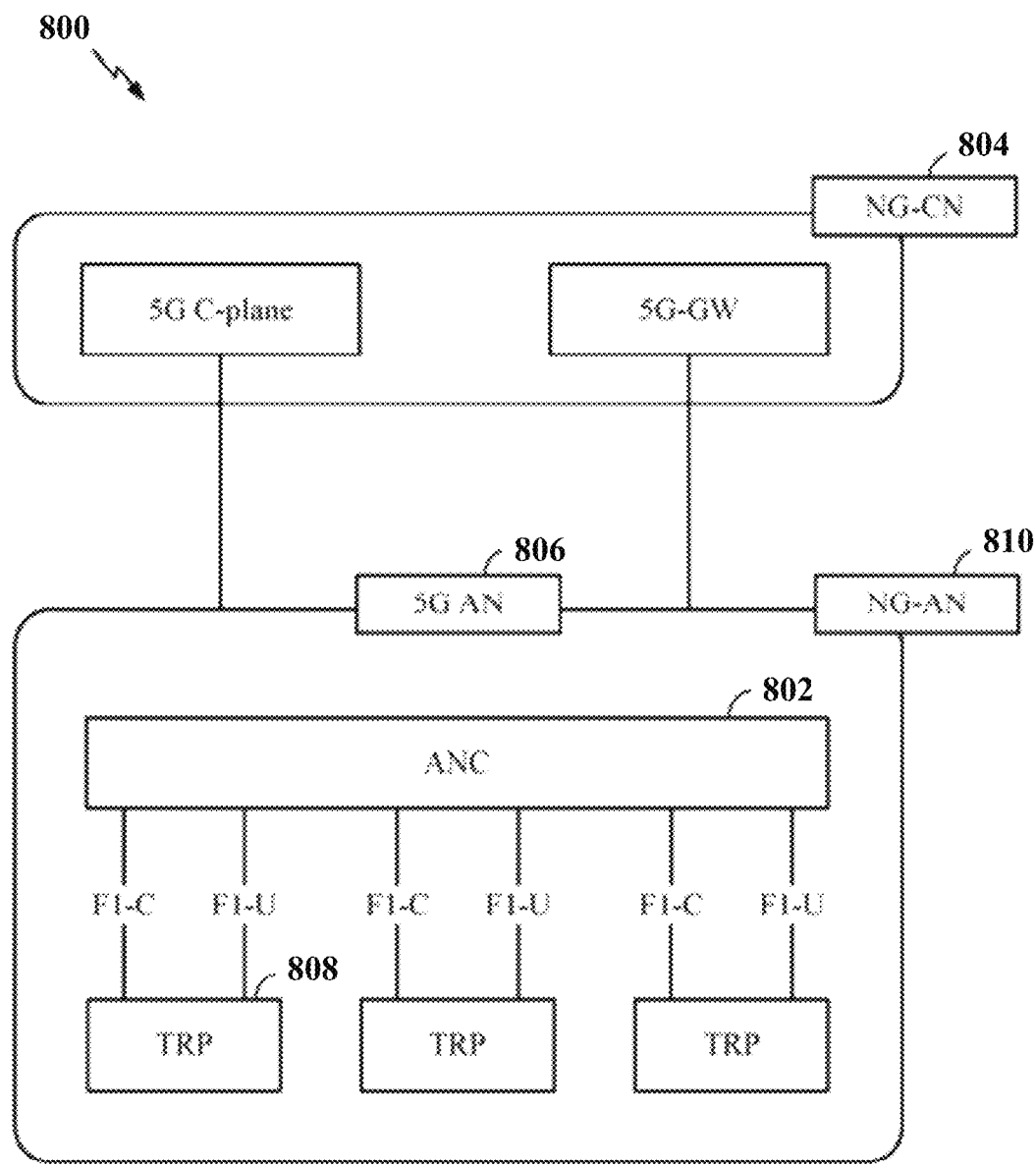
FIG. 8 illustrates an example physical architecture of a distributed access network.

FIG. 8 illustrates an example physical architecture of a distributed RAN 800, according to aspects of the present disclosure. A centralized core network unit (C-CU) 802 may host core network functions. The C-CU may be centrally deployed. C-CU functionality may be offloaded (e.g., to advanced wireless services (AWS)), in an effort to handle peak capacity. A centralized RAN unit (C-RU) 804 may host one or more ANC functions. Optionally, the C-RU may host core network functions locally. The C-RU may have distributed deployment. The C-RU may be closer to the network edge. A distributed unit (DU) 806 may host one or more TRPs. The DU may be located at edges of the network with radio frequency (RF) functionality.

Figure 9:
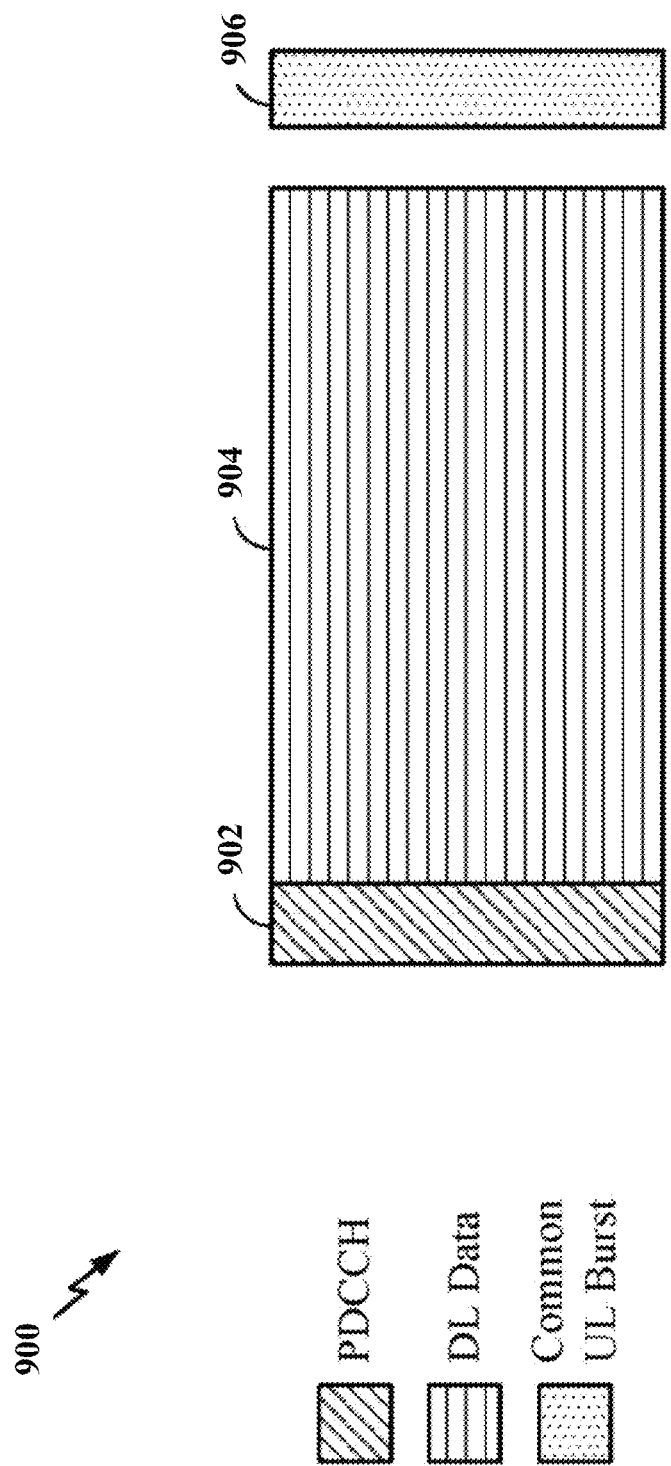
FIG. 9 is a diagram showing an example of a DL-centric subframe.

FIG. 9 is a diagram 900 showing an example of a DL-centric subframe. The DL-centric subframe may include a control portion 902. The control portion 902 may exist in the initial or beginning portion of the DL-centric subframe. The control portion 902 may include various scheduling information and/or control information corresponding to various portions of the DL-centric subframe. In some configurations, the control portion 902 may be a physical DL control channel (PDCCH), as indicated in FIG. 9. The DL-centric subframe may also include a DL data portion 904. The DL data portion 904 may sometimes be referred to as the payload of the DL-centric subframe. The DL data portion 904 may include the communication resources utilized to communicate DL data from the scheduling entity (e.g., UE or BS) to the subordinate entity (e.g., UE). In some configurations, the DL data portion 904 may be a physical DL shared channel (PDSCH).

The DL-centric subframe may also include a common UL portion 906. The common UL portion 906 may sometimes be referred to as an UL burst, a common UL burst, and/or various other suitable terms. The common UL portion 906 may include feedback information corresponding to various other portions of the DL-centric subframe. For example, the common UL portion 906 may include feedback information corresponding to the control portion 902. Non-limiting examples of feedback information may include an ACK signal, a NACK signal, a HARQ indicator, and/or various other suitable types of information. The common UL portion 906 may include additional or alternative information, such as information pertaining to random access channel (RACH) procedures, scheduling requests (SRs), and various other suitable types of information.

As illustrated in FIG. 9, the end of the DL data portion 904 may be separated in time from the beginning of the common UL portion 906. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 10:
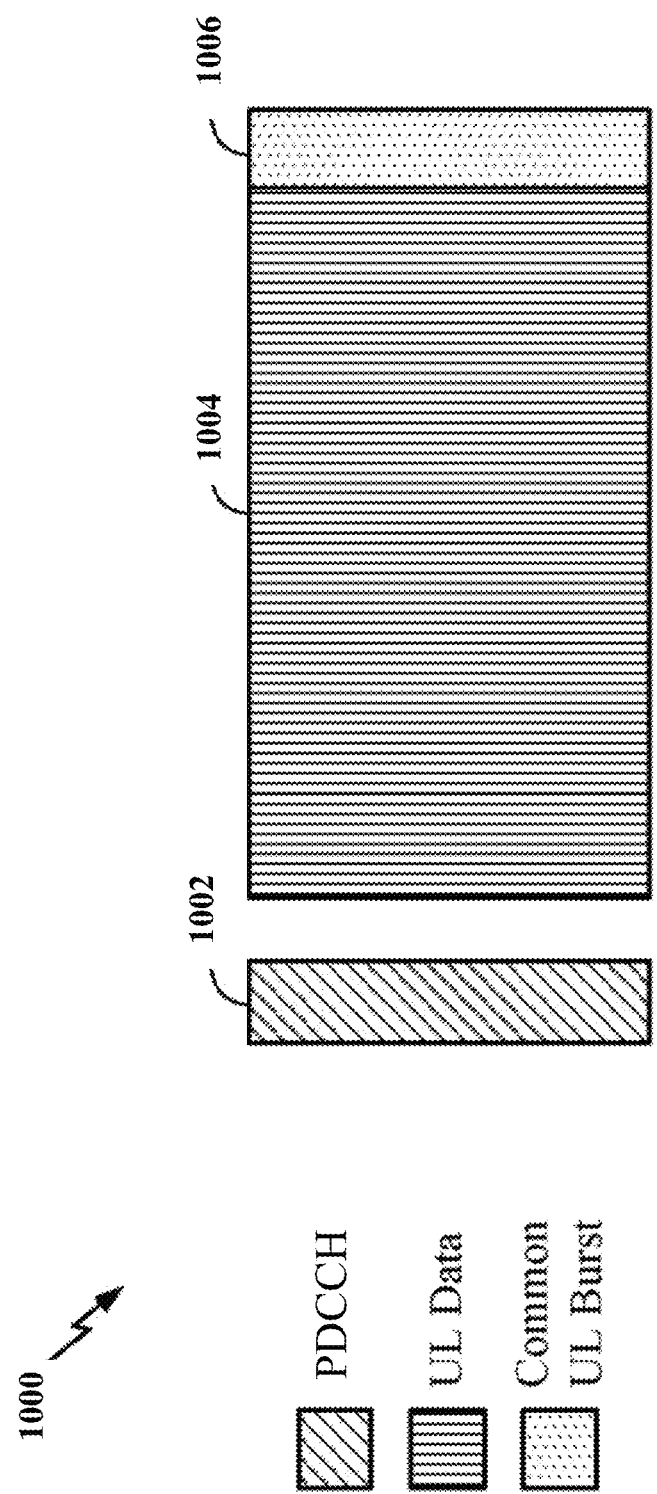
FIG. 10 is a diagram showing an example of an UL-centric subframe.

FIG. 10 is a diagram 1000 showing an example of an UL-centric subframe. The UL-centric subframe may include a control portion 1002. The control portion 1002 may exist in the initial or beginning portion of the UL-centric subframe. The control portion 1002 in FIG. 10 may be similar to the control portion 902 described above with reference to FIG. 9. The UL-centric subframe may also include an UL data portion 1004. The UL data portion 1004 may sometimes be referred to as the pay load of the UL-centric subframe. The UL portion may refer to the communication resources utilized to communicate UL data from the subordinate entity (e.g., UE) to the scheduling entity (e.g., UE or BS). In some configurations, the control portion 1002 may be a physical DL control channel (PDCCH).

As illustrated in FIG. 10, the end of the control portion 1002 may be separated in time from the beginning of the UL data portion 1004. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 1006. The common UL portion 1006 in FIG. 10 may be similar to the common UL portion 906 described above with reference to FIG. 9. The common UL portion 1006 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 11:
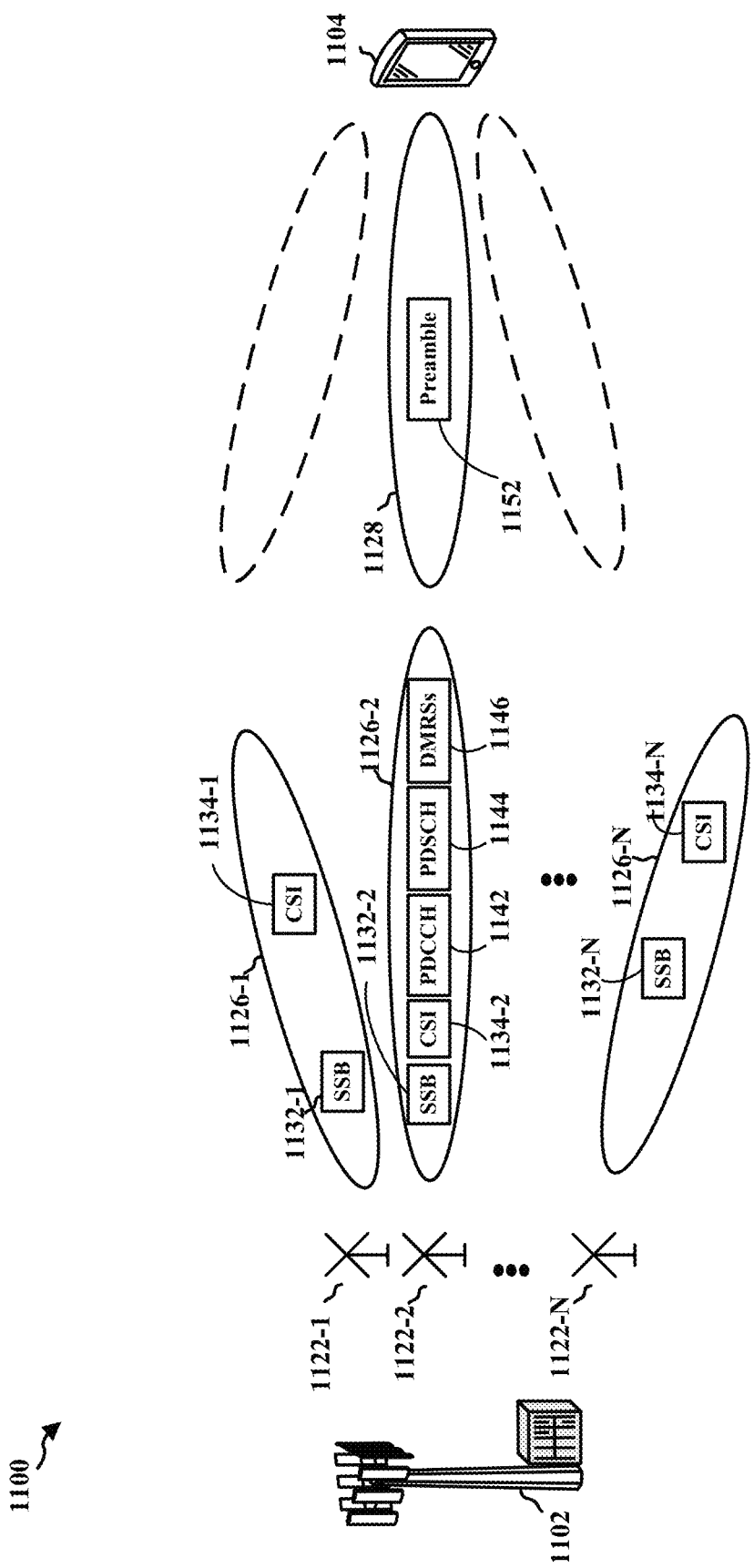
FIG. 11 is a diagram illustrating communications between a base station and a user equipment (UE).

FIG. 11 is a diagram 1100 illustrating communications between a base station 1102 and a UE 1104. The base station 1102 may operates antenna ports 1122-1 to 1122-N. The base station 1102 provides transmitter side beams 1126-1 to 1126-N at different directions. The UE 1104 may use a random access procedure to gain access to a cell of the base station 1102. In this example, to facilitate a UE to perform the random access procedure, the base station 1102 transmits a set of synchronization signal blocks (SSBs) including SSBs 1132-1 to 1132-N, which are associated with the transmitter side beams 1126-1 to 1126-N, respectively. More specifically, the Primary Synchronization Signal (PSS) and the Secondary Synchronization Signal (SSS), together with the Physical Broadcast Channel (PBCH), are jointly referred to as an SSB. Each of the SSBs 1132-1 to 1132-N may include one or more demodulation reference signals (DMRSs) for PBCH. The DMRSs are intended for channel estimation at a UE as part of coherent demodulation.

Further, the base station 1102 may transmit CSI-RS sets 1134-1 to 1134-N that are specific to the UE 1104 by using the transmitter side beams 1126-1 to 1126-N, respectively. A CSI-RS is used by the UE to estimate the channel and report channel state information (CSI) to the base station. A CSI-RS is configured on a per-device basis.

In certain configurations, the UE 1104 may select one of the transmitter side beams 1126-1 to 1126-N randomly or based on a rule for deriving a corresponding preamble sequence used in the random access procedure. In certain configurations, the UE 1104 may adjust the direction of a receiver side beam 1128 to detect and measure the SSBs 1132-1 to 1132-N or the CSI-RS sets 1134-1 to 1134-N. Based on the detection and/or measurements (e.g., SNR measurements), the UE 1104 may select a direction of the receiver side beam 1128 and one of the transmitter side beams 1126-1 to 1126-N for deriving a corresponding preamble sequence used in the random access procedure.

In one example, the UE 1104 may select the transmitter side beam 1126-2 for deriving an associated preamble sequence for use in the random access procedure. More specifically, the UE 1104 is configured with one or more random access resources associated with each the SSBs 1132-1 to 1132-N and/or one or more random access resources associated with each the CSI-RS sets 1134-1 to 1134-N.

Accordingly, the UE 1104 may select a random access resource associated with the downlink reference signal (e.g., SSB or CSI-RS) of the transmitter side beam 1126-2 (i.e., the selected one of the transmitter side beams 1126-1 to 1126-N). Subsequently, the UE 1104 sends a preamble sequence 1152 to the base station 1102 through the receiver side beam 1128 (by assuming a corresponding UE transmit beam can be derived from the receiver side beam 1128) on the selected random access resource. Based on the location of the random access resource in time domain and frequency domain, the base station 1102 can determine the transmitter side beam selected by the UE 1104.

Subsequently, the base station 1102 and the UE 1104 can further complete the random access procedure such that the base station 1102 and the UE 1104 can communicate through the transmitter side beam 1126-2 and the receiver side beam 1128. As such, the UE 1104 is in a connected state (e.g., RRC CONNECTED) with the base station 1102. The base station 1102 may use the transmitter side beam 1126-2 to transmit to the UE 1104 a PDCCH 1142, a PDSCH 1144, and associated DMRSs 1146.

Figure 12:
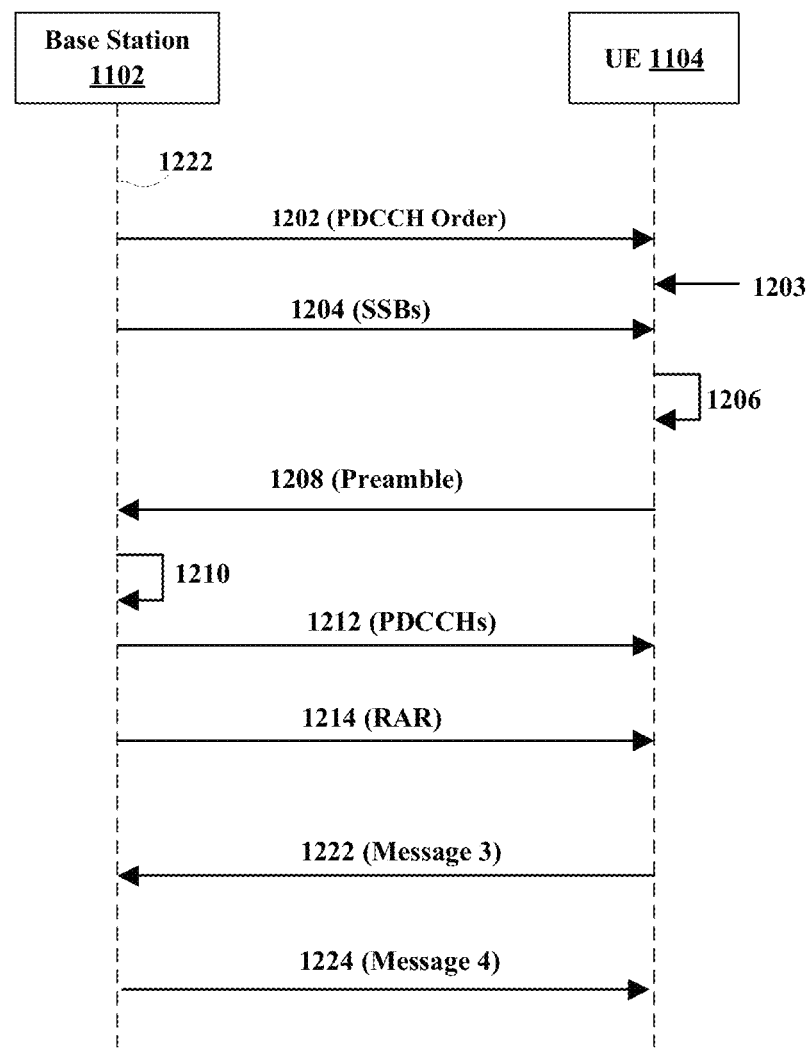
FIG. 12 is diagram illustrating a random access procedure of a UE.

FIG. 12 is diagram 1200 illustrating a random access procedure of a UE. The UE 1104 initiates a random access procedure while in a connected state. At procedure 1204, as described supra, the base station 1102 sends the SSBs 1132-1 to 1132-N and/or the CSI-RS sets 1134-1 to 1134-N associated with the transmitter side beams 1126-1 to 1126-N, respectively. The UE 1104 may detect some or all of the SSBs 1132-1 to 1132-N. Note that procedure 1204 can also take place before procedure 1202.

At procedure 1206, as described supra, in certain configurations, the UE 1104 may select one of the transmitter side beams 1126-1 to 1126-N randomly or based on the measurement result. As an example, the base station 1102 may select the transmitter side beam 1126-1 for deriving an associated preamble sequence 1152 for use in the random access procedure.

Accordingly, the base station 1102 may use a correspondent beam of the transmitter side beam 1126-2 to receive the preamble sequence 1152, which is transmitted on a random access resource associated with the downlink reference signals of the transmitter side beam 1126-1. The UE 1104 determines a timing advance (TA) for the UE 1104 based on the preamble sequence 1152 received through the transmitter side beam 1126-2.

As such, the base station 1102 may receive the preamble sequence 1152 on the transmitter side beam 1126-2. The network of the base station 1102 can also determine that the preamble sequence 1152 was transmitted at a random access resource associated with the SSB 1132-2 and/or the CSI-RS set 1134-2 of the transmitter side beam 1126-2. As such, the network learns that the UE 1104 selected the transmitter side beam 1126-2.

At procedure 1210, the base station 1102 (under the control of the network) generates a random-access response (RAR). The RAR may include information about the preamble sequence 1152 the network detected and for which the response is valid, a TA calculated by the network based on the preamble sequence receive timing, a scheduling grant indicating resources the UE 1104 will use for the transmission of the subsequent message, and/or a temporary identity, the TC-RNTI, used for further communication between the device and the network.

At procedure 1212, the base station 1102 transmits a PDCCH scheduling command for scheduling transmission of the RAR by using the transmitter side beam 1126-2. Accordingly, DMRS of the PDCCH scheduling command and DMRS of the PDCCH order at procedure 1202 are quasi-colocated. Further, the PDCCH scheduling command may be scrambled by a cell radio network temporary identifier (C-RNTI) of the UE 1104, which is known to the network. Further, as described supra, the UE 1104 is in a connected state. The serving beam from the base station 1102 to the UE 1104 may be the transmitter side beam 1126-1. At or about the same time the base station 1102 sends the PDCCH scheduling command for scheduling transmission of the RAR on the transmitter side beam 1126-2, the base station 1102 may also send a PDCCH on the transmitter side beam 1126-1 for scheduling a PDSCH carrying user data.

At procedure 1214, the base station 1102 transmits the RAR to the UE 1104 on the transmitter side beam 1126-2. The RAR may be transmitted in a conventional down-link PDSCH. After the procedure 1214, the up-link of the UE 1104 is time synchronized. However, before user data can be transmitted to/from the UE 1104, a unique identity within the cell, the C-RNTI, must be assigned to the UE 1104 (unless the UE 1104 already has a C-RNTI assigned). Depending on the device state, there may also be a need for additional message exchange for setting up the connection.

Subsequently, at procedure 1222, the UE 1104 transmits a random access message to the base station 1102 using the UL-SCH resources assigned in the random access response in the procedure 1214. An important part of the random access message is the inclusion of a device identity. If the UE 1104 is already known by the base station 1102 and the network, that is, in RRC_CONNECTED or RRC_INACTIVE state, the already-assigned C-RNTI is used as the device identity.

At procedure 1224, the base station 1102 transmits a random access message (message 4) to the UE 1104. When the UE 1104 already has a C-RNTI assigned, the base station 1102 addresses the UE 1104 on the PDCCH scheduling the random access message using the C-RNTI. Upon detection of its C-RNTI on the PDCCH the UE 1104 declares the random-access attempt successful and there is no need for contention-resolution-related information on the DL-SCH. Since the C-RNTI is unique to one device, unintended devices will ignore this PDCCH transmission.

When the UE 1104 does not have a valid C-RNTI, the base station 1102 addresses the random access message and the associated DL-SCH contains the random access message (resolution message) using the TC-RNTI. The device will compare the identity in the message with the identity transmitted in the third step.

In unlicensed spectrum, a device may lose the obtained channel if it pauses for too long in between transmissions within a channel occupancy time (COT). For example, if a base station only transmits control signaling (e.g., PDCCH) but has no corresponding data payload to transmit, then the base station has long transmission pauses in between control channel transmissions. In one example, a base station may transmit short-message paging without the corresponding paging PDSCH. In another example, the base station allocates 4 consecutive slots for transmitting a pair of PDCCH and PDSCH in each slot. In response to a UE's selection, the base station only transmits in the first and fourth slots, and does not transmit in the second and third slots. As such, the base station generates a transmission pause in the second and third slots.

Figure 13:
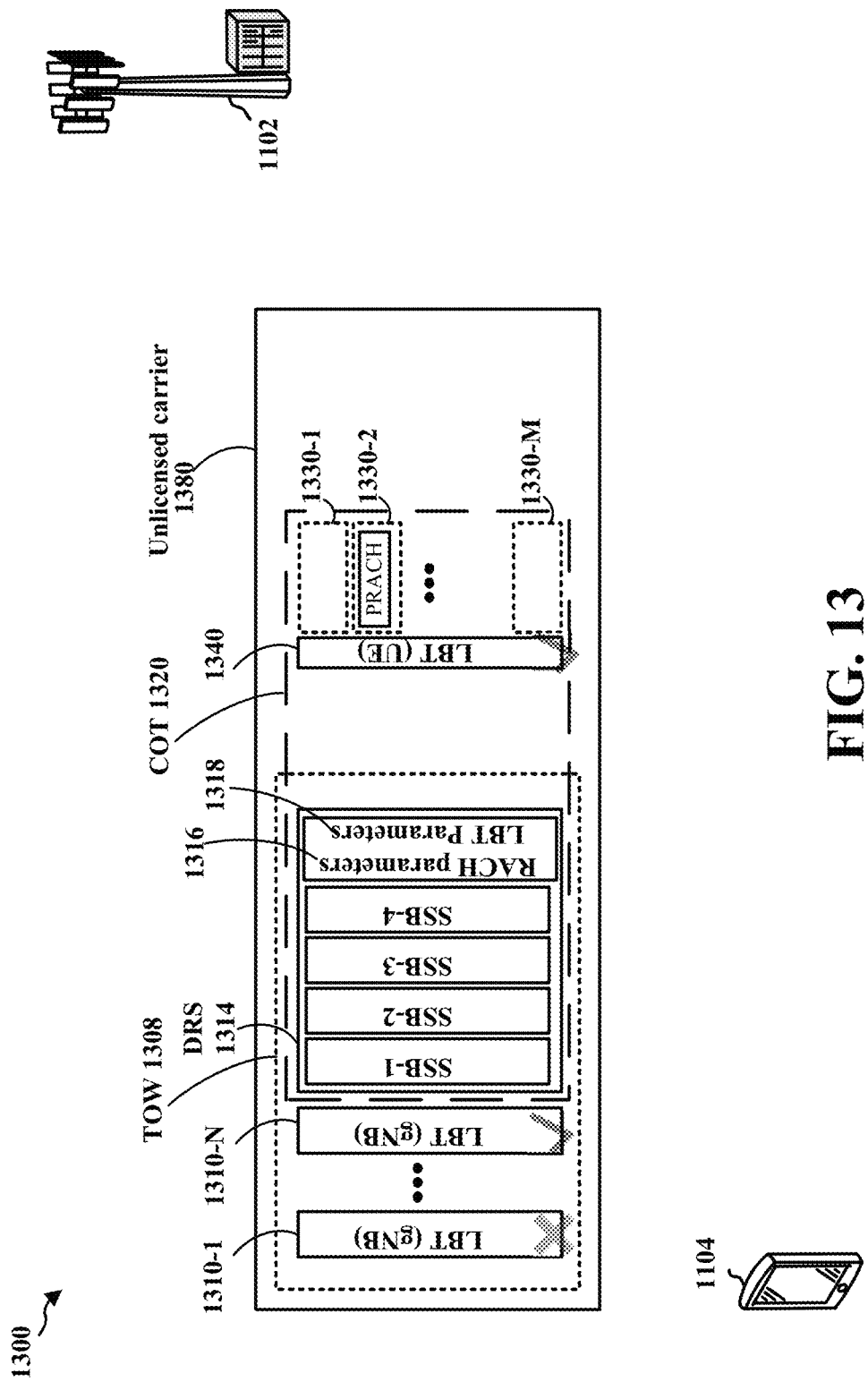
FIG. 13 is a diagram illustrating communication between a base station and a UE on an unlicensed carrier.

FIG. 13 is a diagram 1300 illustrating communication between a base station and a UE on an unlicensed carrier. The UE 1104 and the base station 1102 may communicate an unlicensed carrier 1380, which is in an unlicensed spectrum. In order to access and occupy the unlicensed carrier 1380, the base station 1102 initially performs one or more LBT operations 1310-1 . . . 1310-N, as needed, in each of which the base station 1102 may conduct a CCA procedure as described supra. When the base station 1102 passes the CCA procedure, the base station 1102 may transmit a discovery reference signal 1314. In this example, the base station 1102 did not pass the CCA procedures until the LBT operation 1310-N. As a particular LBT may or may not pass, the base station 1102 does not have a guaranteed time for discovery reference signal transmission. The base station 1102 may be configured to transmit the discovery reference signal at multiple time points of a transmission opportunity window 1308. The base station 1102 may occupy the unlicensed carrier 1380 for a channel occupancy time 1320 after the successful LBT operation 1310-N.

In this example, the base station 1102 transmits the discovery reference signal 1314 after determining that the unlicensed carrier 1380 is clear through the LBT operation 1310-N. The discovery reference signal 1314 may include SSBs #1 to #4 respectively corresponding to transmitter side beams 1126-1 to 1126-4 (referring to FIG. 11), PBCH, and one or more channels (e.g., PDSCH) carrying remaining minimum system information (RMSI). The RMSI includes RACH parameters 1316. The discovery reference signal 1314 may also contain LBT parameters 1318. In configurations, the LBT parameters 1318 may be included in RMSI.

The RACH parameters 1316 may specify one or more RACH occasions 1330-1, . . . , 1330-M, within the channel occupancy time 1320, at which the UE 1104 may transmit a preamble sequence (e.g., the preamble sequence 1152). Further, as described supra, the RACH occasions 1330-1, . . . , 1330-M may correspond to transmitter side beams 1126-1 to 1126-4, respectively. The UE 1104 detects, e.g., in the transmission opportunity window 1308, the SSBs #1 to #4 in the discovery reference signal 1314 and, accordingly, selects one of the RACH occasions 1330-1, . . . , 1330-M for transmitting a preamble sequence. Based on selected RA occasion on which the preamble sequence is received, the base station 1102 may determine the transmitter side beam selected by the UE 1104.

In this example, the UE 1104 selects the RACH occasion 1330-2 corresponding to the transmitter side beam 1126-2. The UE 1104 preforms an LBT operation 1340 prior to the RACH occasion 1330-1 to determine whether the unlicensed carrier 1380 is clear. In particular, the UE 1104 perform the LBT operation 1340 in accordance with the LBT parameters 1318. The LBT parameters 1318 specifies a particular category of LBT operation. The particular category of LBT is one of: a category in which no CCA procedure is performed (category 1), a category in which a CCA procedure without a random backoff is performed (category 2), a category in which a CCA procedure with a random back-off in a contention window of a fixed size is performed (category 3), and a category in which a CCA procedure with a random back-off in a contention window of a variable size is performed (category 4). Further, the LBT parameters 1318 may also specify a Channel Access Priority Class. Channel Access Priority Classes use carrier sense multiple access with collision avoidance (CSMA/CA), and have different channel access parameters, such as arbitrary inter-frame space (AIFS), contention window (CW) size, and transmit opportunity (TXOP) payload duration.

In this example, as the base station 1102 obtained the channel occupancy time 1320 and the RACH occasions 1330-1, . . . , 1330-M are within the channel occupancy time 1320, the base station 1102 may use the LBT parameters 1318 to instruct the UE 1104 to perform a category 1 or category 2 LBT operation. When the UE 1104 successfully performed the LBT operation, the UE 1104 transmits the preamble sequence 1152 in the RACH occasion 1330-2 corresponding to the transmitter side beam 1126-2, as described supra referring to FIG. 11.

Figure 14:
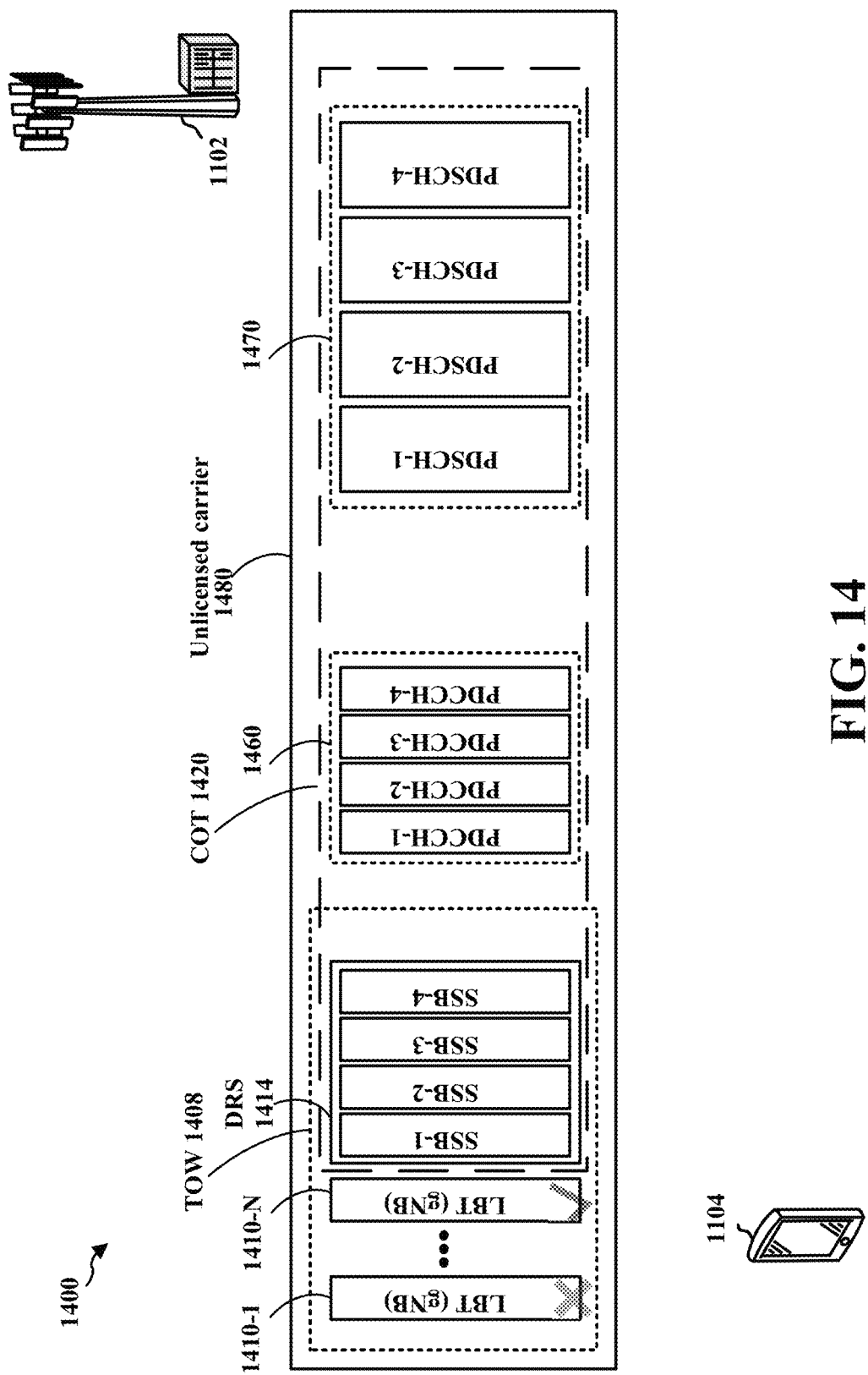
FIG. 14 is a diagram illustrating communication between the base station and the UE on an unlicensed carrier subsequent to FIG. 13.

FIG. 14 is a diagram 1400 illustrating communication between the base station 1102 and the UE 1104 on an unlicensed carrier subsequent to FIG. 13. To retain the channel access in unlicensed spectrum, a base station can transmit the essential control signals in a control burst before transmitting, if any, the corresponding data payloads in a data burst configured by these control signals. The data burst can be transmitted in the same COT as, or a different COT from, the COT in which the control burst is sent. The different control regions in a control burst can be associated with different downlink reference signals, e.g., SSBs or CSI-RS. The control regions may be paging search spaces within a paging occasion when multi-beam operation is considered. The control regions may be RACH search spaces. The different control regions in a control burst can be associated with different paging occasions or RACH search spaces.

More specifically, in this example, the UE 1104 and the base station 1102 may communicate an unlicensed carrier 1480, which is in the same as the unlicensed carrier 1380. In order to access and occupy the unlicensed carrier 1480, the base station 1102 initially performs one or more LBT operations 1410-1 . . . 1410-N, as needed, in each of which the base station 1102 may conduct a CCA procedure as described supra. When the base station 1102 passes the CCA procedure, the base station 1102 may transmit a discovery reference signal 1414. In this example, the base station 1102 did not pass the CCA procedures until the LBT operation 1410-N. In other words, the base station 1102 may transmit an SSB burst (including the SSBs #1 to #4 in this example) at different positions in a preconfigured transmission opportunity window 1408, depending on whether the unlicensed carrier 1480 is busy. The UE 1104 may be configured to detect signals from the base station 1102 in the transmission opportunity window 1408. The base station 1102 may be configured to transmit the discovery reference signal at multiple time points of a transmission opportunity window 1408. The base station 1102 may occupy the unlicensed carrier 1480 for a channel occupancy time 1420 after the successful LBT operation 1410-N.

In this example, the base station 1102 transmits the discovery reference signal 1414 after determining that the unlicensed carrier 1480 is clear through the LBT operation 1410-N. The discovery reference signal 1414 is similar to the discovery reference signal 1314 and includes SSBs #1 to #4 corresponding to the transmitter side beams 1126-1 to 1126-4. As described supra, in this example, the UE 1104 has transmitted the preamble sequence 1152 at the RACH occasion 1330-2, selecting the transmitter side beam 1126-2. Further, some other UEs may have selected the transmitter side beam 1126-1, the transmitter side beam 1126-3, and the transmitter side beam 1126-4. Those UEs accordingly transmitted preamble sequences to the base station 1102 at corresponding ones of the RACH occasions 1330-1, . . . , 1330-M to indicate those selections.

Subsequent to transmitting the discovery reference signal 1414, the base station 1102 transmits PDCCHs #1 to #4 in a control burst 1460 within the channel occupancy time 1420, in response to receiving the preamble sequences corresponding to the SSBs #1 to #4. In certain configurations, the control burst 1460 only contains control channels and does not contain any data channels such as PDSCHs. The PDCCHs #1 to #4 corresponds to the SSBs #1 to #4, respectively, and are transmitted sequentially on the transmitter side beams 1126-1 to 1126-4, respectively. Accordingly, the UE 1104 can decide the order of the PDCCHs #1 to #4 in the control burst 1460 based on the order of the downlink reference signals in the discovery reference signal 1414. In other examples, the order of the PDCCHs #1 to #4 can be indicated at the beginning of the channel occupancy time 1420.

The PDCCHs #1 to #4 may schedule PDSCHs #1 to #4 to be transmitted in a data burst 1470. For example, the PDSCHs #1 to #4 each may contain a RAR replying to the preamble sequences transmitted and corresponding to the SSBs #1 to #4.

In this example, the base station 1102 transmits the data burst 1470 in the same channel occupancy time 1420. In other examples, the data burst 1470 may be transmitted in a different channel occupancy time obtained by the base station 1102 subsequently through LBT. In this example, the data burst 1470 contains the PDSCHs #1 to #4 sequentially transmitted on the transmitter side beams 1126-1 to 1126-4, respectively.

Figure 15:
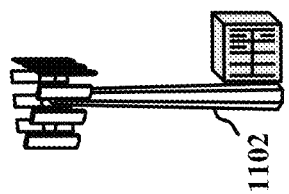
FIG. 15 is a diagram illustrating a transmission burst.
Figure 15:
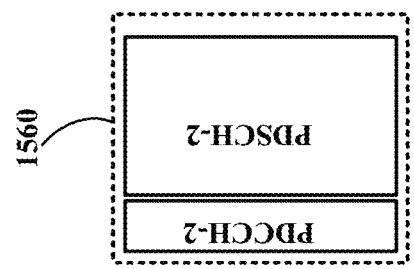
Figure 15:

FIG. 15 is a diagram 1500 illustrating a transmission burst 1560 that can be transmitted by the base station 1102 in pace of the control burst 1460. In this example, the base station 1102 may only have received the preamble sequence 1152 transmitted from the UE 1104 at the RACH occasion 1330-2. Accordingly, the base station 1102 may only need to transmit a PDCCH-#2 and a PDSCH-#2. In certain configurations, the base station 1102 may transmit the PDCCH-#2 and the PDSCH-#2 in the same transmission burst 1560. In this example, the data burst 1470 is not transmitted.

In certain configurations, the PDCCHs #1 to #4 may carry short-message paging messages without corresponding PDSCHs. As such, the base station 1102 only transmits the control burst 1460 without transmitting the data burst 1470.

In certain configurations, the PDCCHs #1 to #4 may schedule paging messages with payloads in the PDSCHs #1 to #4. As such, the base station 1102 transmits both the control burst 1460 and the data burst 1470.

Figure 16:
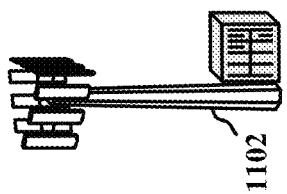
FIG. 16 is a diagram illustrating another transmission burst.
Figure 16:
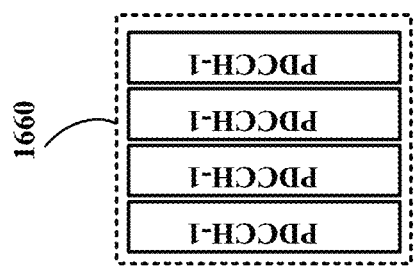
Figure 16:

FIG. 16 is a diagram 1600 illustrating a transmission burst 1660 that can be transmitted by the base station 1102 in pace of the control burst 1460. The transmission burst 1660 contains clustered PDCCH-#1 for paging. As shown, the regions in the control burst 1460 allocated for the PDCCH-#2, the PDCCH-#3, the PDCCH-#4 now carries the same PDCCH-#1, forming the transmission burst 1660. The transmission burst 1660 can immediately follow the SSB burst sets including the SSBs #1 to #4 so that even UEs in the later SSBs can go back to sleep when it detects no paging (P-RNTI).

Figure 17:
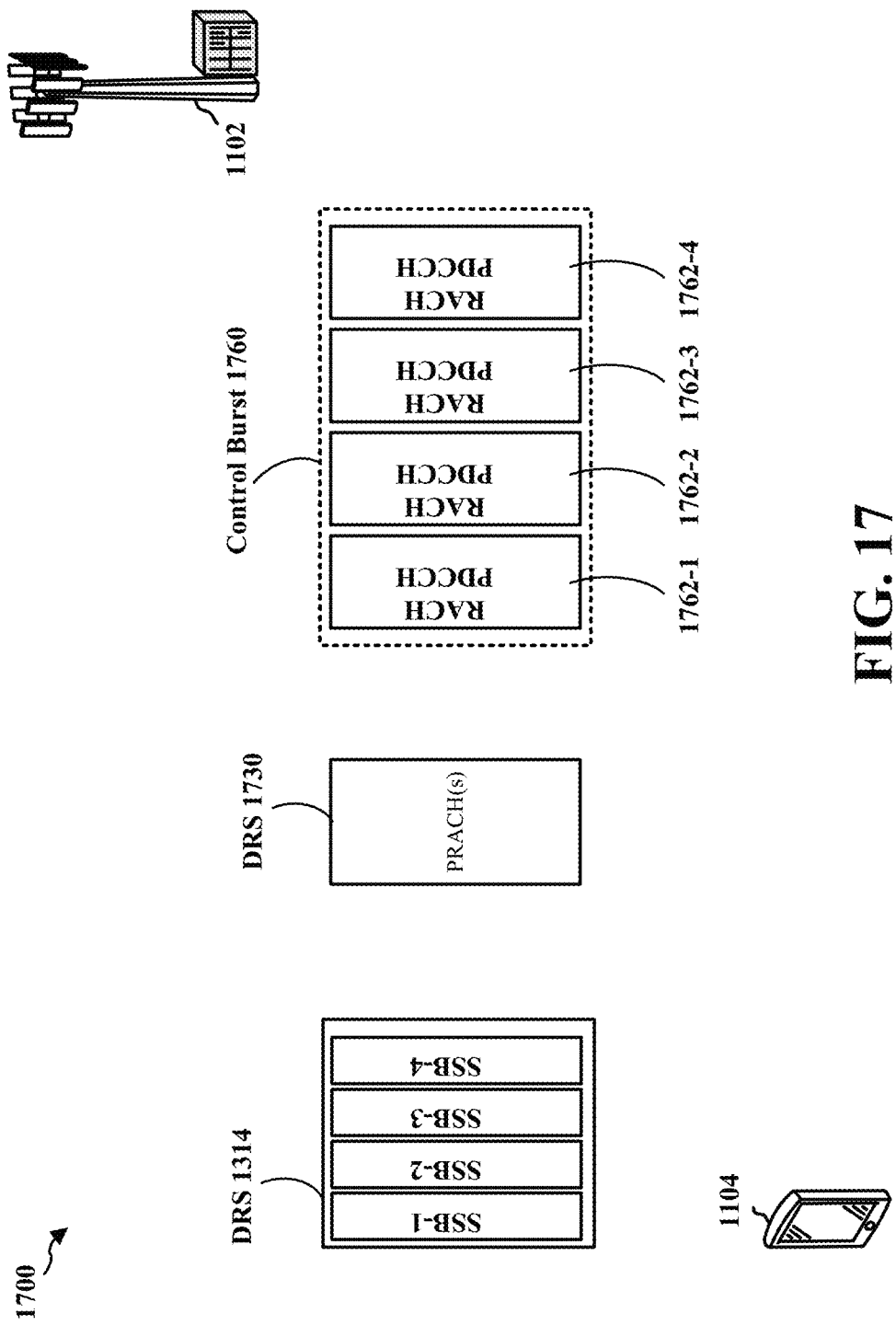
FIG. 17 is a diagram illustrating a control burst.

FIG. 17 is a diagram 1700 illustrating a control burst 1760 that can be transmitted by the base station 1102 in pace of the control burst 1460 shown in FIG. 14. In this example, as described supra, the base station 1102 sends discovery reference signal 1314 containing SSBs #1 to #4. The UE 1104 and some other UEs may send PRACH(s) 1730 to the base station 1102. In response, the base station 1102 may send PDCCHs in a control burst 1760 scheduling RARs. In this example, the control burst 1760 contains RACH PDCCH regions 1762-1 to 1762-4 each may carry a PDCCH. Further, a PDCCH corresponding to any of the SSBs #1 to #4 may be placed in search spaces of any or all of the RACH PDCCH regions 1762-1 to 1762-4. For example, when only the UE 1104 sends the preamble sequence 1152 in the PRACH(s) 1730 to the base station 1102 as described supra, the base station 1102 may use search spaces on all of the RACH PDCCH regions 1762-1 to 1762-4 to carry the PDCCH-#2. Alternatively, the PDCCH-#2 may be placed in any one of the RACH PDCCH regions 1762-1 to 1762-4.

To avoid losing the channel within a COT, the control regions for a first purpose can be at the same time used for a second purpose or shared with control regions for a second purpose. The control signals for the second purpose are always transmitted while the control signals for the first purpose can be present or absent. An example of the first purpose is transmitting paging signals, while an example of the second purpose is transmitting remaining minimum system information (RMSI). The control region for paging is configured the same as that for RMSI. In this way, even when there is no paging signal to be transmitted, the network can retain the channel access since it is transmitting PDCCHs scheduling RMSI in the configured control regions. The RMSI control signals, RMSI data signal, and paging control signals can be part of the discovery reference signal (DRS) in unlicensed bands. The paging data signals can be within the DRS or outside of the DRS.

When RACH resources (preamble and/or occasions) associated with different downlink reference signals are allocated in a TDM manner, if no UEs transmit PRACHs in preceding RACH occasions, there is a chance the channel can be occupied by other cells/RATs and hence following RACH occasions are lost.

Figure 18:
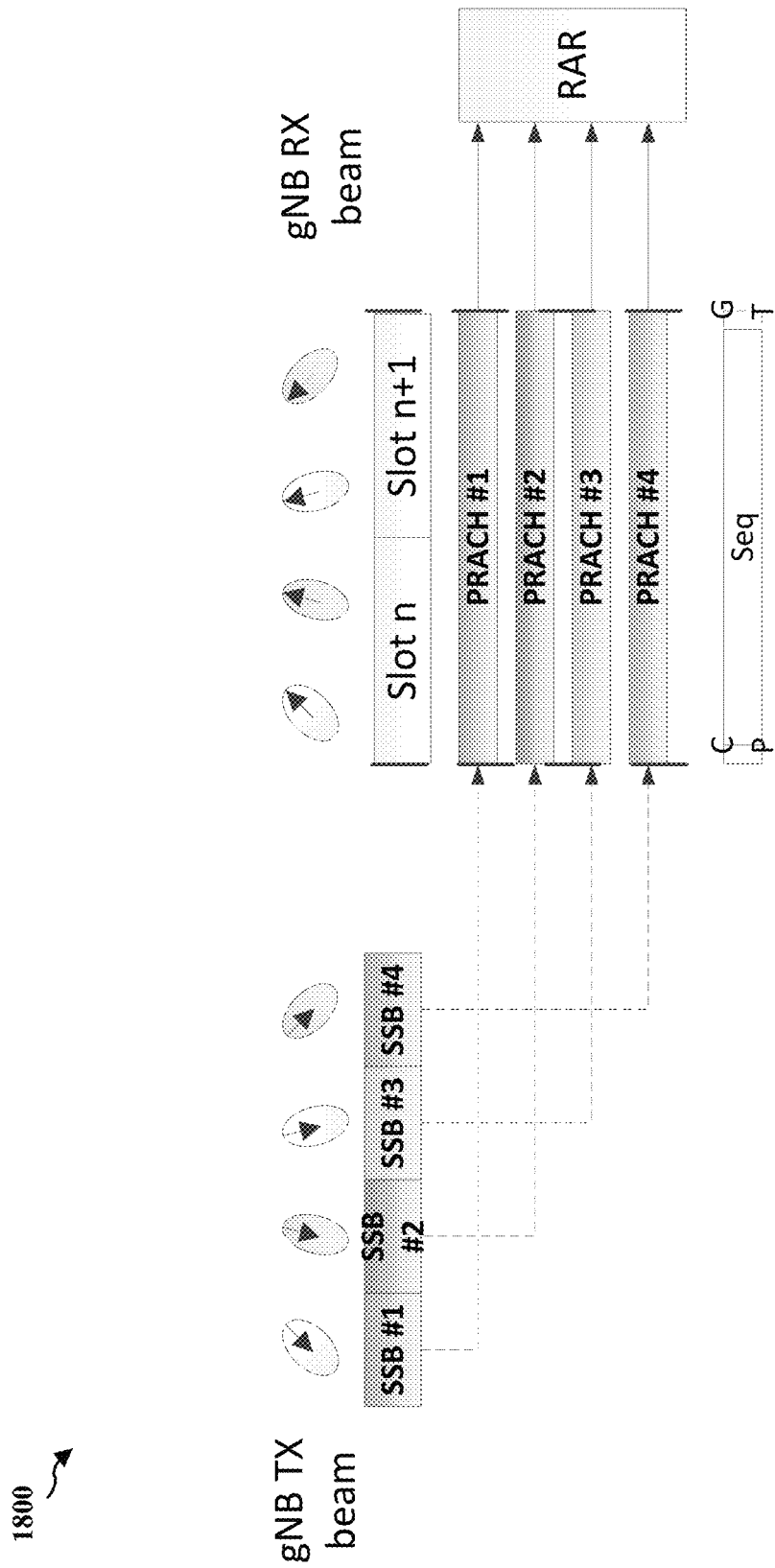
FIG. 18 is a diagram illustrating that preamble sequences are transmitted in accordance with frequency division multiplexing.

In certain configurations, RACH resources (preambles and/or occasions) associated with different downlink reference signals are allocated with each other in accordance with code division multiplexing or in accordance with frequency division multiplexing. In certain configurations, RACH resources can be allocated with other scheduled uplink transmissions such as PUSCH/PUCCH in accordance with code division multiplexing or in accordance with frequency division multiplexing. Further, short reservation signals may be adopted to reserve channels. FIG. 18 is a diagram 1800 illustrating that preamble sequences #1 to #4 corresponding to SSBs #1 to #4 are transmitted from UEs to a base station in accordance with frequency division multiplexing.

Figure 19:
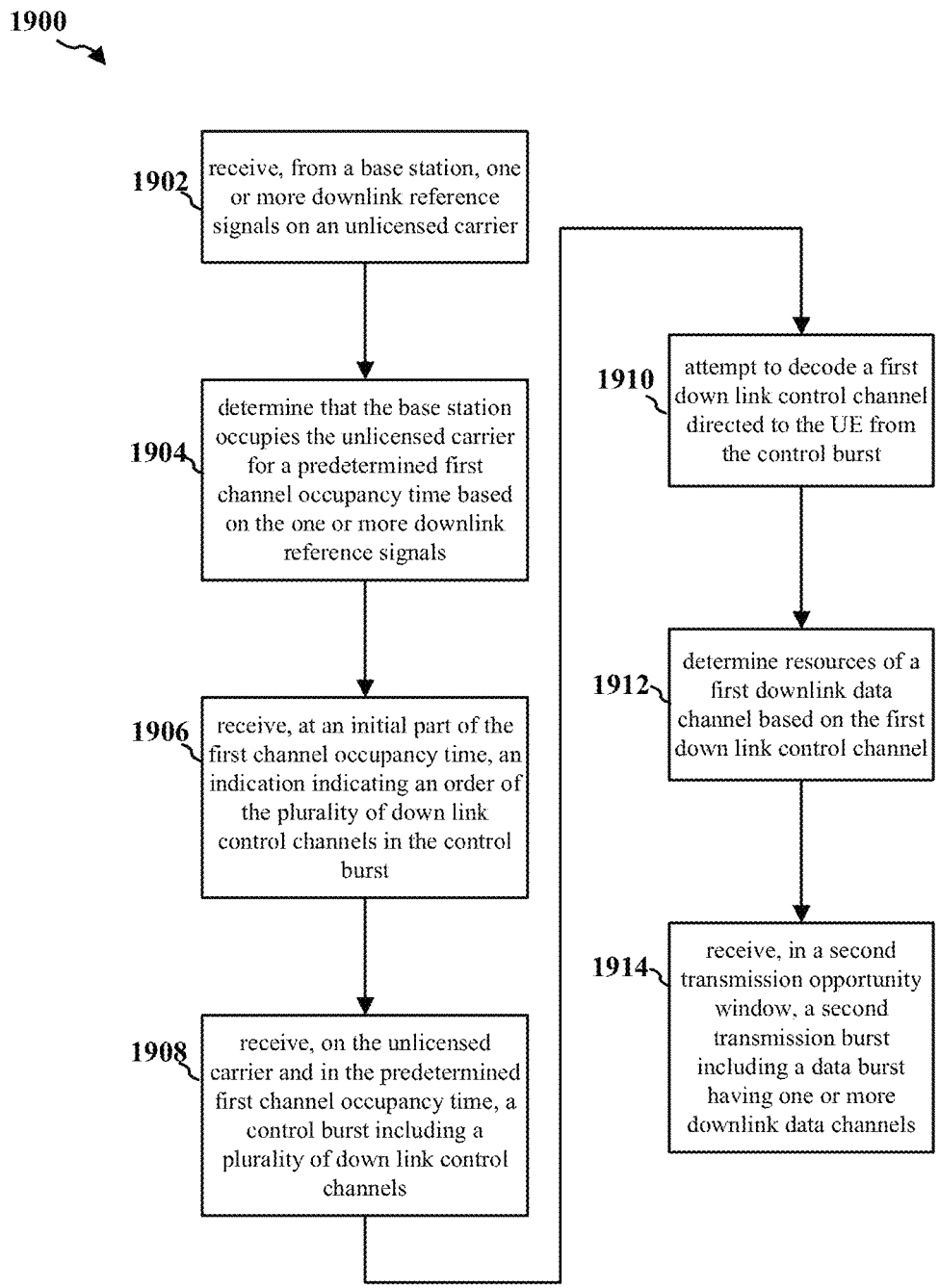
FIG. 19 is a flow chart of a method (process) for communicating on an unlicensed carrier.

FIG. 19 is a flow chart 1900 of a method (process) for communicating on an unlicensed carrier. The method may be performed by a UE (e.g., the UE 1104, the apparatus 2002, and the apparatus 2002'). At operation 1902, the UE receives, from a base station, one or more downlink reference signals on an unlicensed carrier. At operation 1904, the UE determines that the base station occupies the unlicensed carrier for a predetermined first channel occupancy time based on the one or more downlink reference signals. At operation 1906, the UE receives, at an initial part of the first channel occupancy time, an indication indicating an order of a plurality of down link control channels in a control burst. At operation 1908, the UE receives, on the unlicensed carrier and in the predetermined first channel occupancy time, the control burst including the plurality of down link control channels. At operation 1910, the UE attempts to decode a first down link control channel directed to the UE from the control burst. In certain configurations, to decode the first down link control channel, the UE performs decoding on symbols in paging search spaces or random access search spaces allocated to the UE in the control burst.

In certain configurations, the first down link control channel is successfully decoded. At operation 1912, the UE determines resources of a first downlink data channel based on the first down link control channel. In certain configurations, the first downlink data channel is included in a data burst that have one or more downlink data channels scheduled by one or more down link control channels in the control burst. In certain configurations, the control burst is in the first channel occupancy time. In certain configurations, the data burst is in a second channel occupancy time subsequent to the first channel occupancy time. In certain configurations, the one or more downlink reference signals include a plurality of downlink reference signals on a plurality of different beams. The plurality of down link control channels in the control burst correspond to the plurality of downlink reference signals and are received on the plurality of different beams. In certain configurations, the plurality of down link control channels are arranged consecutively in an order in accordance with an order of the plurality of downlink reference signals.

In certain configurations, each of the one or more downlink reference signals is a synchronization signal block or a channel state information reference signal (CSI-RS). In certain configurations, the control burst is included in a first transmission burst received from the base station. The first transmission burst is transmitted in one or more of positions allocated for transmitting the transmission burst in the transmission opportunity window.

At operation 1914, the UE receives, in a second transmission opportunity window, a second transmission burst including a data burst having one or more downlink data channels. In certain configurations, the first transmission burst further includes a data burst, wherein the data burst contains one or more downlink data channels scheduled by one or more of the plurality of down link control channels in the control burst. In certain configurations, each search space in the control burst is allocated to carry any one of the plurality of down link control channels. In certain configurations, a first part of the plurality of down link control channels carries a first type of signal and a second part of the plurality of down link control channels carries a second type of signal. In certain configurations, the first type of signal is a paging signal and the second type of signal is a signal carrying remaining minimum system information (RMSI). In certain configurations, prior to receiving the control burst, the UE transmits a preamble sequence based on code division multiplexing. In certain configurations, prior to receiving the control burst, the UE transmits a preamble sequence based on frequency division multiplexing.

Figure 20:
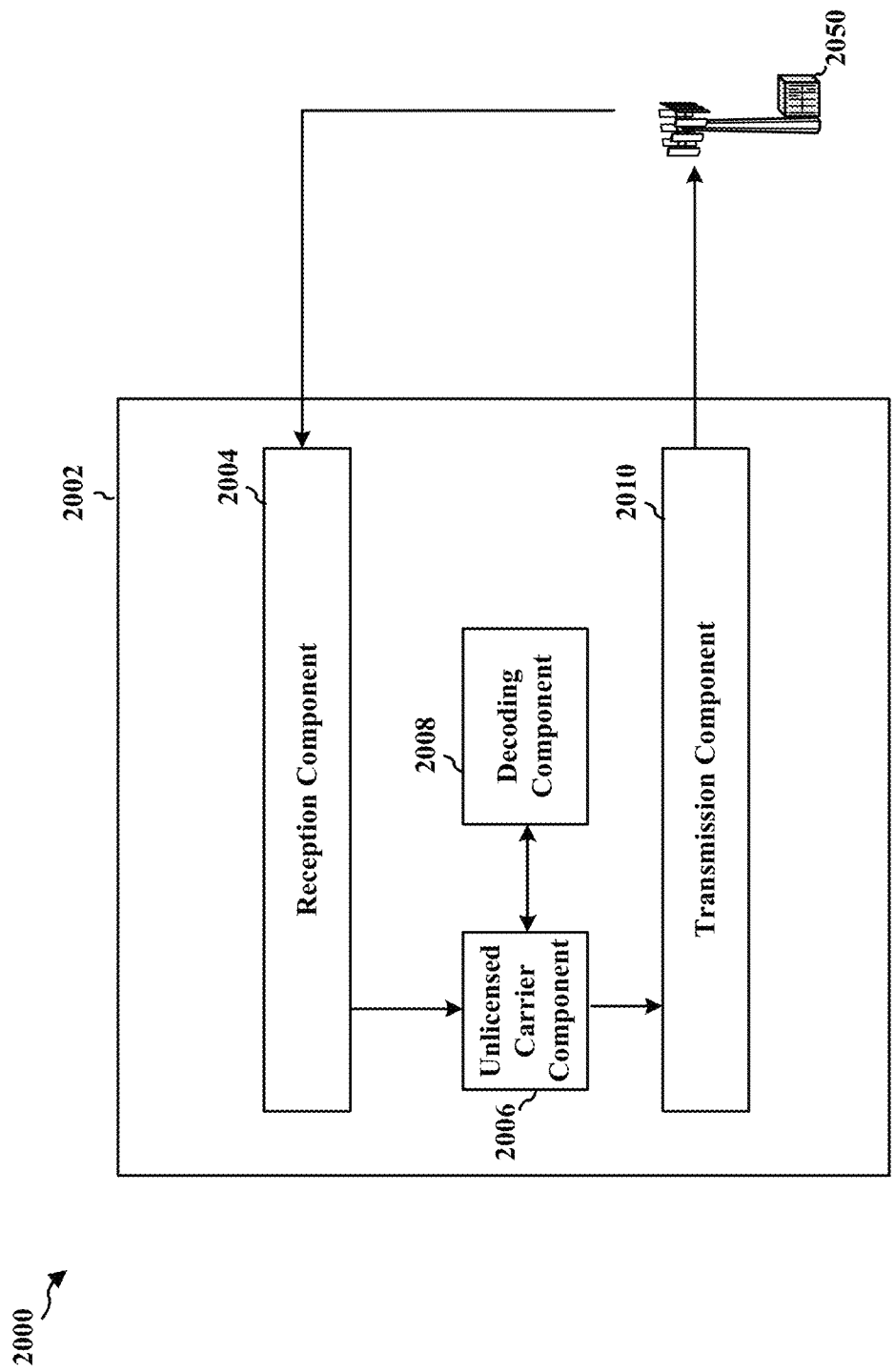
FIG. 20 is a conceptual data flow diagram illustrating the data flow between different components/means in an exemplary apparatus.

FIG. 20 is a conceptual data flow diagram 2000 illustrating the data flow between different components/means in an exemplary apparatus 2002. The apparatus 2002 may be a UE. The apparatus 2002 includes a reception component 2004, an unlicensed carrier component 2006, a decoding component 2008, and a transmission component 2010.

The unlicensed carrier component 2006 receives, from a base station, one or more downlink reference signals on an unlicensed carrier. The unlicensed carrier component 2006 determines that the base station occupies the unlicensed carrier for a predetermined first channel occupancy time based on the one or more downlink reference signals. The unlicensed carrier component 2006 receives, at an initial part of the first channel occupancy time, an indication indicating an order of a plurality of down link control channels in a control burst. The decoding component 2008 receives, on the unlicensed carrier and in the predetermined first channel occupancy time, the control burst including the plurality of down link control channels. The decoding component 2008 attempts to decode a first down link control channel directed to the UE from the control burst. In certain configurations, to decode the first down link control channel, the decoding component 2008 performs decoding on symbols in paging search spaces or random access search spaces allocated to the UE in the control burst.

In certain configurations, the first down link control channel is successfully decoded. The unlicensed carrier component 2006 determines resources of a first downlink data channel based on the first down link control channel. In certain configurations, the first downlink data channel is included in a data burst that have one or more downlink data channels scheduled by one or more down link control channels in the control burst. In certain configurations, the control burst is in the first channel occupancy time. In certain configurations, the data burst is in a second channel occupancy time subsequent to the first channel occupancy time. In certain configurations, the one or more downlink reference signals include a plurality of downlink reference signals on a plurality of different beams. The plurality of down link control channels in the control burst correspond to the plurality of downlink reference signals and are received on the plurality of different beams. In certain configurations, the plurality of down link control channels are arranged consecutively in an order in accordance with an order of the plurality of downlink reference signals.

In certain configurations, each of the one or more downlink reference signals is a synchronization signal block or a channel state information reference signal (CSI-RS). In certain configurations, the control burst is included in a first transmission burst received from the base station. The first transmission burst is transmitted in one or more of positions allocated for transmitting the transmission burst in the transmission opportunity window.

The decoding component 2008 receives, in a second transmission opportunity window, a second transmission burst including a data burst having one or more downlink data channels. In certain configurations, the first transmission burst further includes a data burst, wherein the data burst contains one or more downlink data channels scheduled by one or more of the plurality of down link control channels in the control burst. In certain configurations, each search space in the control burst is allocated to carry any one of the plurality of down link control channels. In certain configurations, a first part of the plurality of down link control channels carries a first type of signal and a second part of the plurality of down link control channels carries a second type of signal. In certain configurations, the first type of signal is a paging signal and the second type of signal is a signal carrying remaining minimum system information (RMSI). In certain configurations, prior to receiving the control burst, the UE transmits a preamble sequence based on code division multiplexing. In certain configurations, prior to receiving the control burst, the UE transmits a preamble sequence based on frequency division multiplexing.

Figure 21:
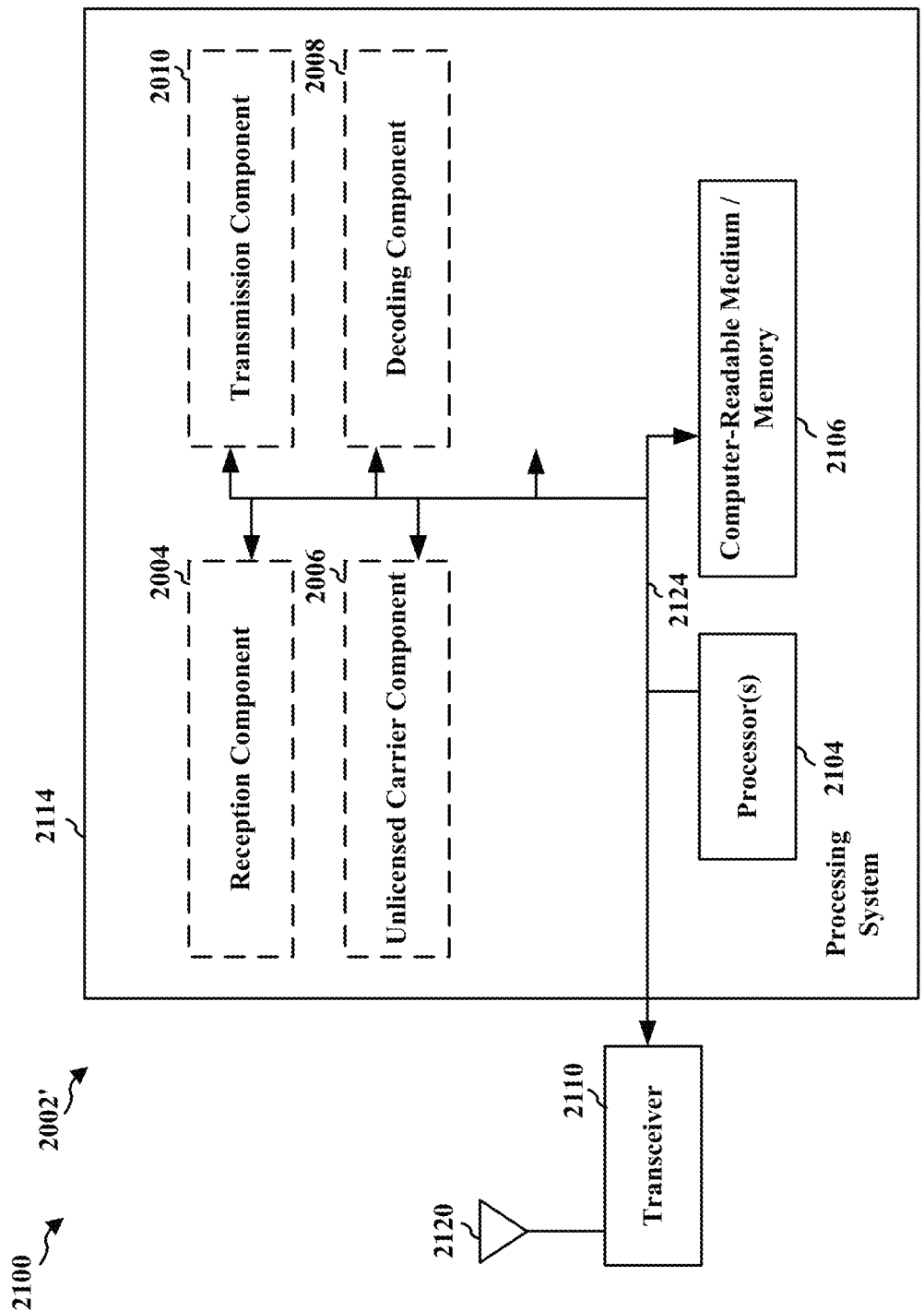
FIG. 21 is a diagram illustrating an example of a hardware implementation for an apparatus employing a processing system.

FIG. 21 is a diagram 2100 illustrating an example of a hardware implementation for an apparatus 2002' employing a processing system 2114. The apparatus 2002' may be a UE. The processing system 2114 may be implemented with a bus architecture, represented generally by a bus 2124. The bus 2124 may include any number of interconnecting buses and bridges depending on the specific application of the processing system 2114 and the overall design constraints. The bus 2124 links together various circuits including one or more processors and/or hardware components, represented by one or more processors 2104, the reception component 2004, the unlicensed carrier component 2006, the decoding component 2008, the transmission component 2010, and a computer-readable medium/memory 2106. The bus 2124 may also link various other circuits such as timing sources, peripherals, voltage regulators, and power management circuits, etc.

The processing system 2114 may be coupled to a transceiver 2110, which may be one or more of the transceivers 654. The transceiver 2110 is coupled to one or more antennas 2120, which may be the communication antennas 652.

The transceiver 2110 provides a means for communicating with various other apparatus over a transmission medium. The transceiver 2110 receives a signal from the one or more antennas 2120, extracts information from the received signal, and provides the extracted information to the processing system 2114, specifically the reception component 2004. In addition, the transceiver 2110 receives information from the processing system 2114, specifically the transmission component 2010, and based on the received information, generates a signal to be applied to the one or more antennas 2120.

The processing system 2114 includes one or more processors 2104 coupled to a computer-readable medium/memory 2106. The one or more processors 2104 are responsible for general processing, including the execution of software stored on the computer-readable medium/memory 2106. The software, when executed by the one or more processors 2104, causes the processing system 2114 to perform the various functions described supra for any particular apparatus. The computer-readable medium/memory 2106 may also be used for storing data that is manipulated by the one or more processors 2104 when executing software. The processing system 2114 further includes at least one of the reception component 2004, the unlicensed carrier component 2006, the decoding component 2008, and the transmission component 2010. The components may be software components running in the one or more processors 2104, resident/stored in the computer readable medium/memory 2106, one or more hardware components coupled to the one or more processors 2104, or some combination thereof. The processing system 2114 may be a component of the UE 650 and may include the memory 660 and/or at least one of the TX processor 668, the RX processor 656, and the communication processor 659.

In one configuration, the apparatus 2002/apparatus 2002' for wireless communication includes means for performing each of the operations of FIG. 19. The aforementioned means may be one or more of the aforementioned components of the apparatus 2002 and/or the processing system 2114 of the apparatus 2002' configured to perform the functions recited by the aforementioned means.

As described supra, the processing system 2114 may include the TX Processor 668, the RX Processor 656, and the communication processor 659. As such, in one configuration, the aforementioned means may be the TX Processor 668, the RX Processor 656, and the communication processor 659 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   receiving, from a base station, one or more downlink reference signals on a carrier;
   receiving, on the carrier, a control burst including a plurality of down link control channels; and
   attempting to decode a first down link control channel directed to the UE from the control burst, wherein the one or more downlink reference signals include a plurality of downlink reference signals on a plurality of different beams, wherein the plurality of down link control channels in the control burst correspond to the plurality of downlink reference signals and are received on the plurality of different beams, wherein the plurality of down link control channels are arranged consecutively in an order in accordance with an order of the plurality of downlink reference signals.

2. The method of claim 1, wherein the attempting to decode the first down link control channel includes performing decoding on symbols in paging search spaces or random access search spaces allocated to the UE in the control burst.

3. The method of claim 1, wherein the first down link control channel is successfully decoded, the method further comprising:
   determining resources of a first downlink data channel based on the first down link control channel.

4. The method of claim 3, wherein the first downlink data channel is included in a data burst that have one or more downlink data channels scheduled by one or more down link control channels in the control burst.

5. The method of claim 4, wherein the control burst is in a first channel occupancy time.

6. The method of claim 5, wherein the data burst is in a second channel occupancy time subsequent to the first channel occupancy time.

7. The method of claim 1, wherein the carrier is on an unlicensed spectrum.

8. The method of claim 7, further comprising: determining that the base station occupies the carrier on the unlicensed spectrum for a first channel occupancy time based on the one or more downlink reference signals.

9. The method of claim 8, further comprising:
   receiving, at an initial part of the first channel occupancy time, an indication indicating an order of the plurality of down link control channels in the control burst.

10. The method of claim 1, wherein each of the one or more downlink reference signals is a synchronization signal block or a channel state information reference signal (CSI-RS).

11. The method of claim 1, wherein the control burst is included in a first transmission burst received from the base station, wherein the first transmission burst is transmitted in one or more of positions allocated for transmitting the transmission burst in the transmission opportunity window.

12. The method of claim 11, further comprising:
   receiving, in a second transmission opportunity window, a second transmission burst including a data burst having one or more downlink data channels.

13. The method of claim 11, wherein the first transmission burst further includes a data burst, wherein the data burst contains one or more downlink data channels scheduled by one or more of the plurality of down link control channels in the control burst.

14. The method of claim 13, wherein each search space in the control burst is allocated to carry any one of the plurality of down link control channels.

15. The method of claim 1, wherein a first part of the plurality of down link control channels carries a first type of signal and a second part of the plurality of down link control channels carries a second type of signal.

16. The method of claim 15, wherein the first type of signal is a paging signal and the second type of signal is a signal carrying remaining minimum system information (RMSI).

17. The method of claim 1, further comprising:
prior to receiving the control burst, transmitting a preamble sequence based on code division multiplexing.

18. The method of claim 1, further comprising:
prior to receiving the control burst, transmitting a preamble sequence based on frequency division multiplexing.

19. An apparatus for wireless communication, the apparatus being a user equipment (UE), comprising:
a memory; and
at least one processor coupled to the memory and configured to:
receive, from a base station, one or more downlink reference signals on a carrier;
receive, on the carrier, a control burst including a plurality of down link control channels; and
attempt to decode a first down link control channel directed to the UE from the control burst, wherein the one or more downlink reference signals include a plurality of downlink reference signals on a plurality of different beams, wherein the plurality of down link control channels in the control burst correspond to the plurality of downlink reference signals and are received on the plurality of different beams, wherein the plurality of down link control channels are arranged consecutively in an order in accordance with an order of the plurality of downlink reference signals.

20. A non-transitory computer-readable medium storing computer executable code for wireless communication of a user equipment (UE), comprising code to:
receive, from a base station, one or more downlink reference signals on a carrier;
receive, on the carrier, a control burst including a plurality of down link control channels; and
attempt to decode a first down link control channel directed to the UE from the control burst, wherein the one or more downlink reference signals include a plurality of downlink reference signals on a plurality of different beams, wherein the plurality of down link control channels in the control burst correspond to the plurality of downlink reference signals and are received on the plurality of different beams, wherein the plurality of down link control channels are arranged consecutively in an order in accordance with an order of the plurality of downlink reference signals.

* * * * *